(12) United States Patent
Zerlina et al.

(10) Patent No.: US 9,830,484 B1
(45) Date of Patent: Nov. 28, 2017

(54) TRACKING LOCATIONS AND CONDITIONS OF OBJECTS BASED ON RFID SIGNALS

(71) Applicant: Amazon Technologies, Inc., Reno, NV (US)

(72) Inventors: Fransisca Vina Zerlina, Seattle, WA (US); Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 14/314,593

(22) Filed: Jun. 25, 2014

(51) Int. Cl.
*G06K 7/00* (2006.01)
*G06K 7/10* (2006.01)
*B65D 5/42* (2006.01)

(52) U.S. Cl.
CPC .......... *G06K 7/10366* (2013.01); *B65D 5/42* (2013.01); *G06K 7/10455* (2013.01); *B65D 2101/00* (2013.01); *B65D 2203/06* (2013.01)

(58) Field of Classification Search
CPC .... B65D 5/42; B65D 5/6605; B65D 2101/00; B65D 2203/06; G06K 19/073; G06K 19/07749; G06K 19/07798; G06K 7/10455; G06K 19/07381; G06K 7/10366; G08B 13/06; G08B 13/2417; G08B 13/2445; G08B 13/241

See application file for complete search history.

(56) References Cited

U.S. PATENT DOCUMENTS

| 5,099,977 A | 3/1992 | Hirose et al. |
| 6,366,242 B1 | 4/2002 | Boyd et al. |
| 6,531,964 B1 | 3/2003 | Loving |
| 6,825,751 B1 | 11/2004 | Kita et al. |
| 7,336,174 B1 | 2/2008 | Maloney |
| 7,385,479 B1 | 6/2008 | Green et al. |

(Continued)

FOREIGN PATENT DOCUMENTS

| JP | 2000286761 A | 10/2000 |
| JP | 2006165892 A | 6/2006 |

(Continued)

OTHER PUBLICATIONS

"A Capacitive Touch Interface for Passive RFID Tags," Sample, A.P., Yeager, D.J., and Smith, J.R. 2009 IEEE International Conference on RFID, pp. 103-109.

(Continued)

*Primary Examiner* — Thomas Alunkal
(74) *Attorney, Agent, or Firm* — Athorus, PLLC

(57) ABSTRACT

Locations and conditions of objects within a working environment may be tracked using RFID signals. A working surface within the environment may include a plurality of RFID antennas, and the objects to be tracked may include RFID tags. When one of the objects passes within an operational range of one of the antennas, an RFID signal is transmitted from the tag on the object to the antenna, and the location of the object may be determined based on the location of the antenna. Additionally, where a plurality of tags that are specially associated with a different aspect of a condition of an object are provided thereon, the condition of the object may be determined based on a number of the tags from which RFID signals are received, and the aspects of the condition with which each of such tags is associated.

17 Claims, 14 Drawing Sheets

(56) References Cited

U.S. PATENT DOCUMENTS

| | | | |
|---|---|---|---|
| 8,169,303 B2 | 5/2012 | Hanebeck | |
| 8,482,412 B2 | 7/2013 | Majoros et al. | |
| 8,542,834 B1 | 9/2013 | Feikis et al. | |
| 8,556,178 B2 | 10/2013 | Wang et al. | |
| 8,893,969 B2 | 11/2014 | Brandl | |
| 9,405,948 B2 | 8/2016 | Schwiers et al. | |
| 2002/0067264 A1* | 6/2002 | Soehnlen | B65D 5/42 340/572.1 |
| 2002/0185542 A1 | 12/2002 | Wilz et al. | |
| 2003/0075608 A1* | 4/2003 | Atherton | G06K 19/073 235/492 |
| 2003/0136635 A1 | 7/2003 | Lauch | |
| 2003/0189493 A1 | 10/2003 | Klausner et al. | |
| 2004/0066296 A1* | 4/2004 | Atherton | G08B 13/1445 340/572.1 |
| 2004/0118916 A1 | 6/2004 | He | |
| 2004/0119605 A1 | 6/2004 | Schaper | |
| 2005/0183990 A1 | 8/2005 | Corbett | |
| 2005/0200476 A1 | 9/2005 | Forr et al. | |
| 2005/0203798 A1 | 9/2005 | Jensen et al. | |
| 2005/0219050 A1 | 10/2005 | Martin | |
| 2005/0234774 A1 | 10/2005 | Dupree | |
| 2005/0243784 A1 | 11/2005 | Fitzgerald et al. | |
| 2005/0284941 A1* | 12/2005 | Lubow | G06K 19/06018 235/462.01 |
| 2006/0044110 A1* | 3/2006 | Napolitano | G06K 17/0022 340/5.92 |
| 2006/0119481 A1 | 6/2006 | Tethrake et al. | |
| 2006/0145880 A1* | 7/2006 | Chi | G01F 23/284 340/612 |
| 2006/0186201 A1 | 8/2006 | Hart | |
| 2006/0187061 A1* | 8/2006 | Colby | G06K 19/025 340/572.8 |
| 2006/0244593 A1 | 11/2006 | Nycz et al. | |
| 2006/0284839 A1 | 12/2006 | Breed et al. | |
| 2007/0018832 A1 | 1/2007 | Beigel et al. | |
| 2007/0021197 A1 | 1/2007 | Frerking | |
| 2007/0030151 A1 | 2/2007 | Morrow | |
| 2007/0057469 A1 | 3/2007 | Grauzer et al. | |
| 2007/0075148 A1 | 4/2007 | Usami | |
| 2007/0075861 A1 | 4/2007 | Cook et al. | |
| 2007/0083283 A1 | 4/2007 | Ara et al. | |
| 2007/0096906 A1* | 5/2007 | Lyons | G06K 19/0717 340/572.1 |
| 2007/0100677 A1 | 5/2007 | Boss et al. | |
| 2007/0109101 A1 | 5/2007 | Colby | |
| 2007/0126578 A1* | 6/2007 | Broussard | G06K 17/0022 340/572.1 |
| 2007/0136218 A1 | 6/2007 | Bauer et al. | |
| 2007/0152829 A1* | 7/2007 | Lindsay | G06K 19/0717 340/572.3 |
| 2007/0164863 A1 | 7/2007 | Himberger et al. | |
| 2007/0175972 A1 | 8/2007 | Ringer | |
| 2007/0296599 A1* | 12/2007 | Wang | B65D 55/028 340/572.8 |
| 2008/0093176 A1 | 4/2008 | Rosenthal | |
| 2008/0113767 A1 | 5/2008 | Nguyen et al. | |
| 2008/0185265 A1 | 8/2008 | Alemany et al. | |
| 2008/0297324 A1 | 12/2008 | Tuttle | |
| 2009/0033463 A1 | 2/2009 | Posamentier | |
| 2009/0085721 A1 | 4/2009 | Dishongh | |
| 2009/0167699 A1 | 7/2009 | Rosenblatt et al. | |
| 2009/0309086 A1 | 12/2009 | Behan et al. | |
| 2010/0063652 A1 | 3/2010 | Anderson | |
| 2010/0097195 A1 | 4/2010 | Majoros et al. | |
| 2010/0114426 A1 | 5/2010 | Boss et al. | |
| 2010/0123581 A1 | 5/2010 | Hatfield et al. | |
| 2010/0171592 A1 | 7/2010 | Kamemaru | |
| 2010/0177993 A1* | 7/2010 | Chen | B65D 33/2533 383/207 |
| 2010/0271187 A1 | 10/2010 | Uysal et al. | |
| 2010/0308964 A1 | 12/2010 | Ackley et al. | |
| 2010/0308975 A1 | 12/2010 | Gregersen et al. | |
| 2010/0312606 A1 | 12/2010 | Gala | |
| 2011/0163850 A1 | 7/2011 | Bachman et al. | |
| 2011/0227748 A1 | 9/2011 | Schaible et al. | |
| 2011/0266342 A1 | 11/2011 | Forster | |
| 2011/0285507 A1* | 11/2011 | Nelson | G06K 19/0739 340/10.1 |
| 2012/0299703 A1* | 11/2012 | Chen | G06Q 10/087 340/10.1 |
| 2013/0027191 A1 | 1/2013 | Wilkinson | |
| 2013/0218511 A1 | 8/2013 | Mager et al. | |
| 2013/0314207 A1 | 11/2013 | Yonekura et al. | |
| 2013/0342349 A1 | 12/2013 | Cruz | |
| 2014/0002113 A1 | 1/2014 | Schediwy et al. | |
| 2014/0012161 A1 | 1/2014 | Ross | |
| 2014/0061303 A1 | 3/2014 | Brandl | |
| 2014/0061382 A1 | 3/2014 | Tucker | |
| 2014/0111333 A1 | 4/2014 | Haas | |
| 2014/0121903 A1 | 5/2014 | Lee | |
| 2014/0148988 A1 | 5/2014 | Lathrop et al. | |
| 2014/0176307 A1 | 6/2014 | Forster | |
| 2014/0186219 A1 | 7/2014 | Yukimoto | |
| 2014/0232519 A1* | 8/2014 | Allen | G06Q 30/0283 340/5.9 |
| 2015/0357948 A1 | 12/2015 | Goldstein | |
| 2015/0360567 A1 | 12/2015 | Sannomiya et al. | |

FOREIGN PATENT DOCUMENTS

| | | |
|---|---|---|
| JP | 2007286965 A | 11/2007 |
| WO | 2014093968 A1 | 6/2014 |

OTHER PUBLICATIONS

International Search Report and Written Opinion of PCT Application No. PCT/US2015/037287 dated Sep. 30, 2015.

International Search Report and Written Opinion of PCT Application No. PCT/US2015/056779 dated Jan. 19, 2016.

International Search Report for International Application No. PCT 2015/037531 dated Sep. 25, 2015.

Office Action for Japanese Patent Application No. 2016-570836 dated Aug. 28, 2017.

* cited by examiner

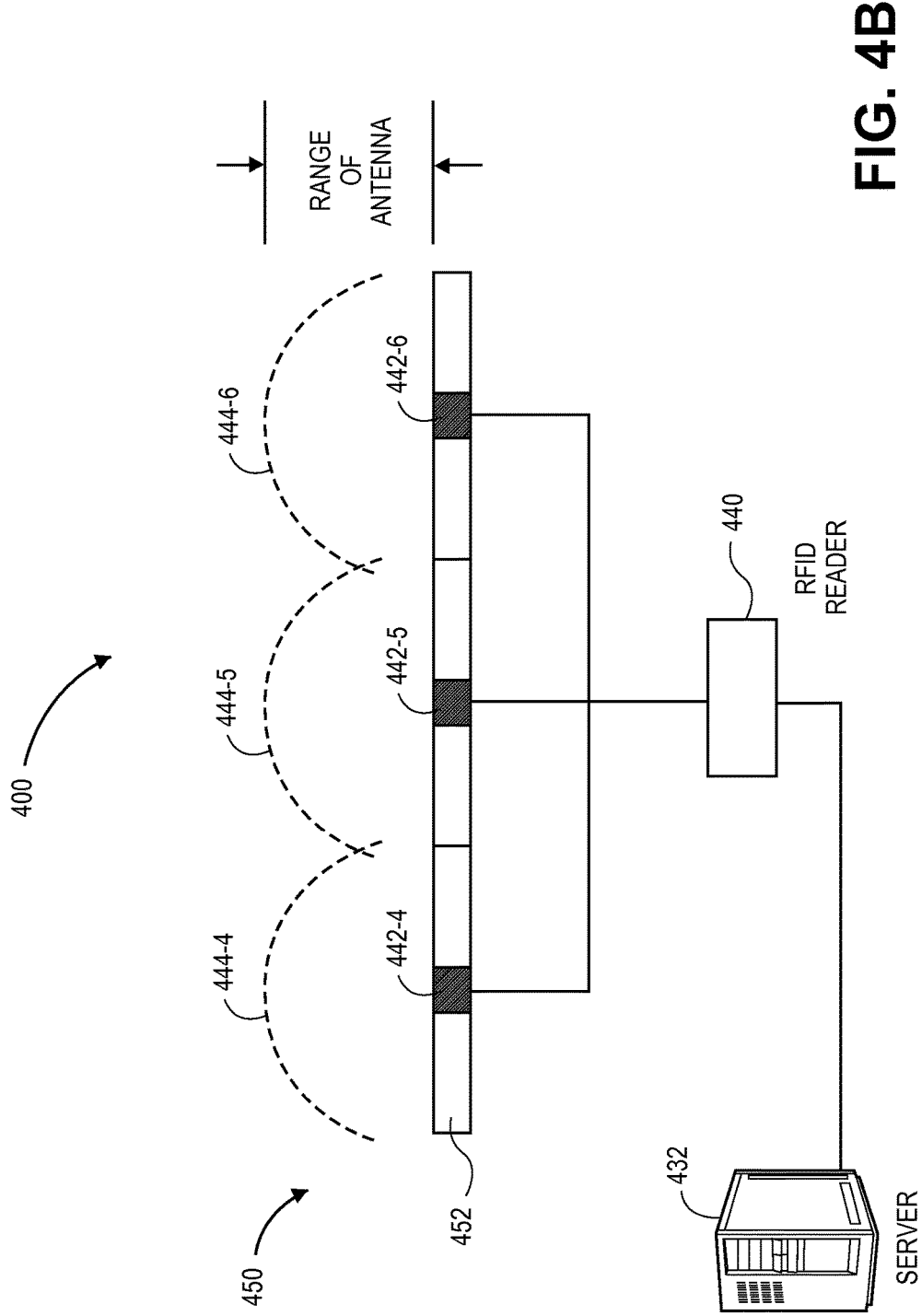

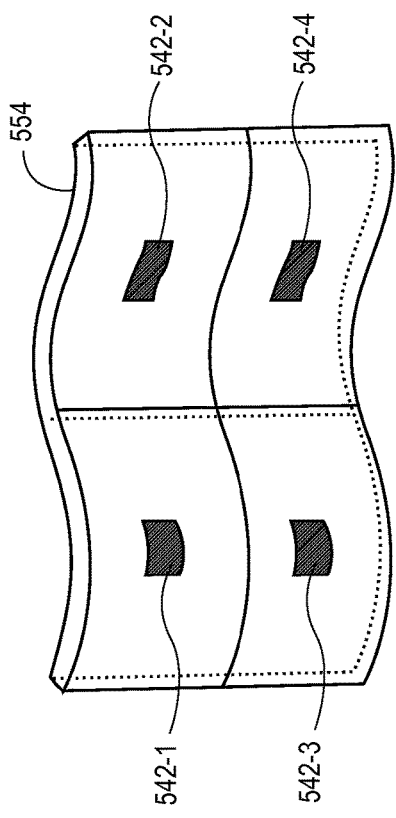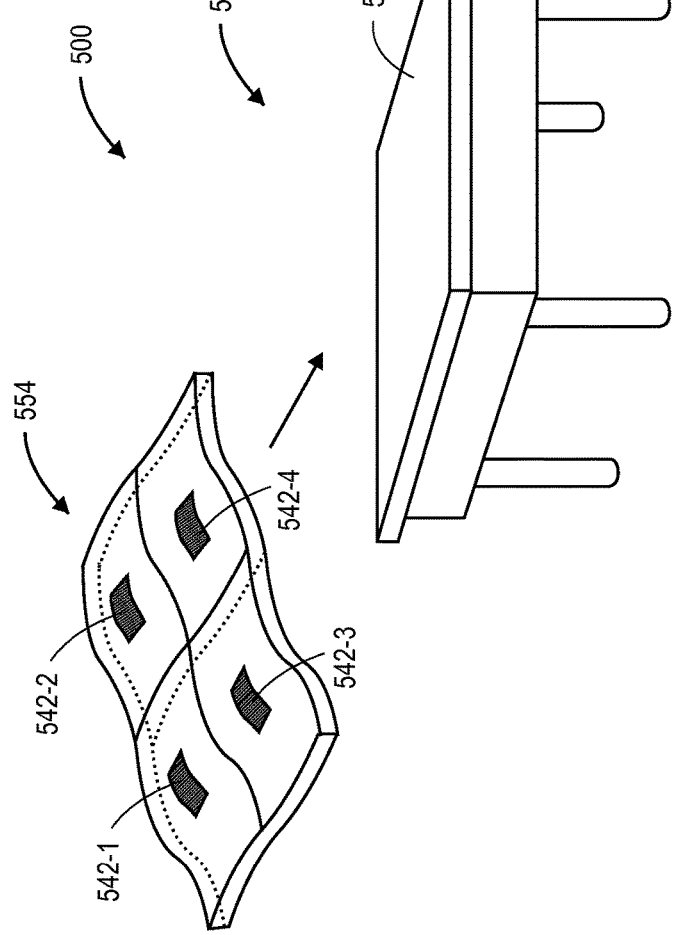

TRACKING LOCATIONS AND CONDITIONS OF OBJECTS BASED ON RFID SIGNALS

BACKGROUND

Workers who actively perform tasks at workbenches, desks or other working surfaces frequently operate tools, utensils, implements, instruments or other apparatuses. For example, a carpenter's workbench may include one or more hammers, screwdrivers, drills, wrenches or other handheld tools. A sewing table may feature various types of scissors for cutting fabric or embroidery, as well as rippers, hooks and various spools of thread to be used by a seamstress or tailor. A teacher's desk may include one or more pens, pencils, staplers, tape dispensers, erasers and the like, as well as one or more computer devices or peripherals (e.g., laptop computers, tablet computers, mice, trackballs or track pads). Because not every apparatus is required to perform each of the tasks that may be completed at such a working surface, a worker may frequently pick up and put down one or more tools in various locations on the working surface, which may also be covered with raw materials or accessories such as paper, cloth, wood or metal of various kinds or types.

Occasionally, however, one or more of the various apparatuses used to perform tasks at a working surface may be lost or temporarily misplaced. Existing systems or techniques for maintaining control over such apparatuses, such as tethering the apparatuses to portions of the working surface, or marking the apparatuses with an identifier associated with the working surface, are limited in their effectiveness, for various reasons. For example, a tether may hinder or restrict the normal operation of an apparatus at the workstation, or prevent the apparatus from being temporarily used at other workstations. Likewise, a marking or other identifier may not, by itself, prevent the apparatus from being lost or misplaced, particularly when a worker's hands cover the identifier during normal operation.

Additionally, in an industrial or commercial environment in which large numbers of items arrive, depart or are stored at high rates of speed, the ability to quickly and easily capture and record information regarding conditions of such items may be hindered. For example, in a fulfillment center environment, items may be received from multiple sources at any given time, and may be automatically transferred from one location to another, e.g., by way of one or more conveyors. A worker who notices a defect or deficiency associated with an item or its packaging, or another condition that may require special handling, must typically remove the item from a conveyor, manually or automatically record information regarding the item and its condition, and then manually transport the item to a specific location or return the item to the conveyor system. Such actions necessarily delay the processing of the item, as well as the capacity to timely address any deficiencies associated with its condition.

BRIEF DESCRIPTION OF THE DRAWINGS

FIGS. 4A, 4B, 4C and 4D are views of components of one system for tracking locations or conditions of objects using RFID signals in accordance with embodiments of the present disclosure.

FIGS. 5A, 5B and 5C are views of one system for tracking locations or conditions of objects using RFID signals in accordance with embodiments of the present disclosure.

DETAILED DESCRIPTION

Figure 1A:
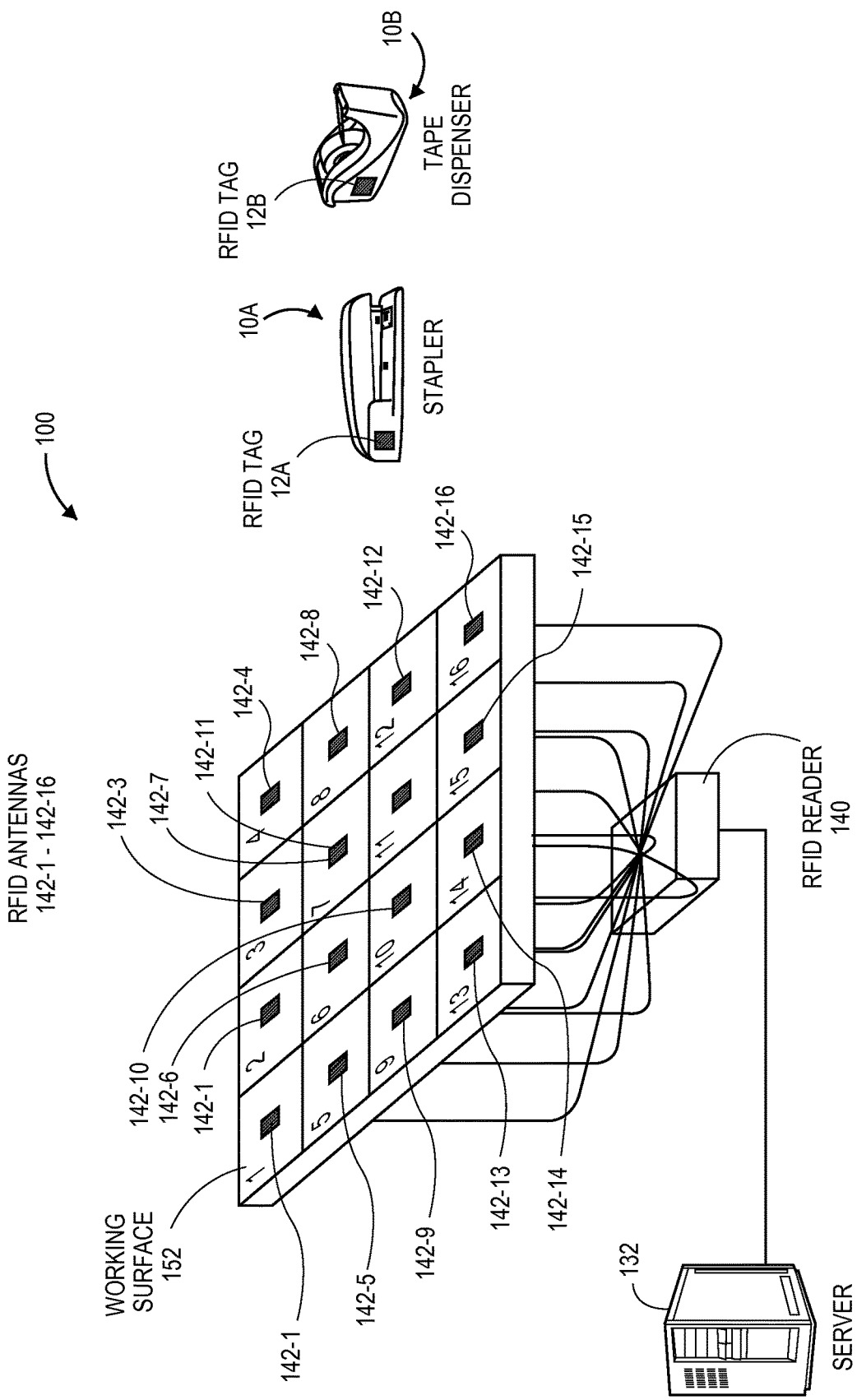
FIGS. 1A and 1B are views of one system for tracking locations or conditions of objects using RFID signals in accordance with embodiments of the present disclosure.

As is set forth in greater detail below, the present disclosure is directed to the use of radio frequency identification (or "RFID") devices for tracking the positions or conditions of objects such as tools, utensils, implements, instruments or other apparatuses at a workstation. Specifically, the systems and methods disclosed herein are directed to providing a plurality of localized short-range RFID antennas in discrete locations on a working surface of a workstation, e.g., a desk, a workbench or a wall, and applying or affixing RFID tags (e.g., transmitters or other transmitting devices) to devices for which locations are to be tracked. When one or more of the objects is placed on the working surface within a vicinity of one of the short-range RFID antennas, an RFID signal may be transmitted from the RFID tag to the proximate short-range RFID antenna, and information regarding the RFID signal may be received at an RFID reader. The information may identify not only the RFID tag from which the RFID signal was transmitted but also the short-range RFID antenna at which the RFID signal was received, and may thereby reference a discrete location on the workstation where the object is located. Conversely, when the object is removed from the working surface to a point beyond an effective range of any of the short-range RFID antennas, the connection between the RFID tag and the RFID reader will open, thereby terminating the RFID signal, and indicating that the object is no longer within any of the discrete locations. Information regarding the discrete locations at which the object is located, or the fact that the object is not located anywhere on the working surface of the working station, may be stored in at least one data store.

Additionally, the systems and methods of the present disclosure are directed to providing a plurality of specially or uniquely purposed RFID tags on an object, each of which may be configured to transmit an RFID signal associated with a predetermined attribute or element pertaining to a condition of the object. The predetermined attribute or element may relate to any aspect of a condition of any type of object, e.g., an indicator of the integrity of a structure associated with the object, such as a container.

For example, a specially or uniquely purposed RFID tag may be associated with the presence of the predetermined attribute or element, such that the RFID tag is configured to transmit a positive or "TRUE" RFID signal indicating that the object to which the RFID tag is applied is experiencing the attribute or the element pertaining to the condition.

According to some embodiments of the present disclosure, specially purposed RFID tags that are configured to transmit positive or "TRUE" RFID signals may be provided in a pre-shielded form, such as by enveloping or shrouding the RFID tags with one or more blocking or shielding agents or layers (e.g., a releasable shielding layer), which prevent the RFID tags from being energized by electromagnetic energy or fields provided by a nearby RFID antenna or RFID reader. If a human worker or machine determines that the attribute or the element pertaining to the condition of the object is present, however, the human worker or machine may remove (e.g., tear off) the blocking or shielding agent or layer, thereby enabling the RFID tags to be energized from any nearby RFID antenna or reader, and to transmit the positive or "TRUE" RFID signals to the RFID antenna or RFID reader.

Alternatively, specially purposed RFID tags may be associated with the absence of the predetermined attribute or element, such that the RFID tag is configured to transmit a negative or "FALSE" RFID signal, indicating that the object to which the RFID tag is applied is not experiencing the attribute or the element pertaining to the condition. According to some other embodiments of the present disclosure, specially purposed RFID tags that are configured to transmit negative or "FALSE" RFID signals may be provided in an exposed form, such that the RFID tags will be energized from electromagnetic energy or fields when within an operational range of an RFID antenna or RFID reader, and transmit negative or "FALSE" signals to the RFID antenna or RFID reader. If a human worker or machine determines that an attribute or an element pertaining to a condition of an object that is associated with such a specially purposed RFID tag is present, however, the human worker or machine may apply a blocking or shielding agent or layer over the RFID tag, thereby precluding the RFID tag from transmitting the negative or "FALSE" RFID signals to the RFID antenna or RFID reader.

Any number of specially or uniquely purposed RFID tags may be applied to an object in accordance with embodiments of the present disclosure. When the object is within an operational range of an RFID antenna or an RFID reader, a condition of the object may be determined based on a number of RFID signals received from such RFID tags. For example, when an object bearing a plurality of specially purposed RFID tags configured to transmit positive or "TRUE" RFID signals arrives within an operational range of an RFID antenna or an RFID reader, a condition of the object may be determined based on the number and type of RFID signals received from such tags. Conversely, when an object bearing a plurality of specially purposed RFID tags configured to transmit negative or "FALSE" RFID signals arrives within an operational range of an RFID antenna or an RFID reader, a condition of the object may be determined based on a number and type of RFID signals expected but not received from such tags.

Figure 1B:
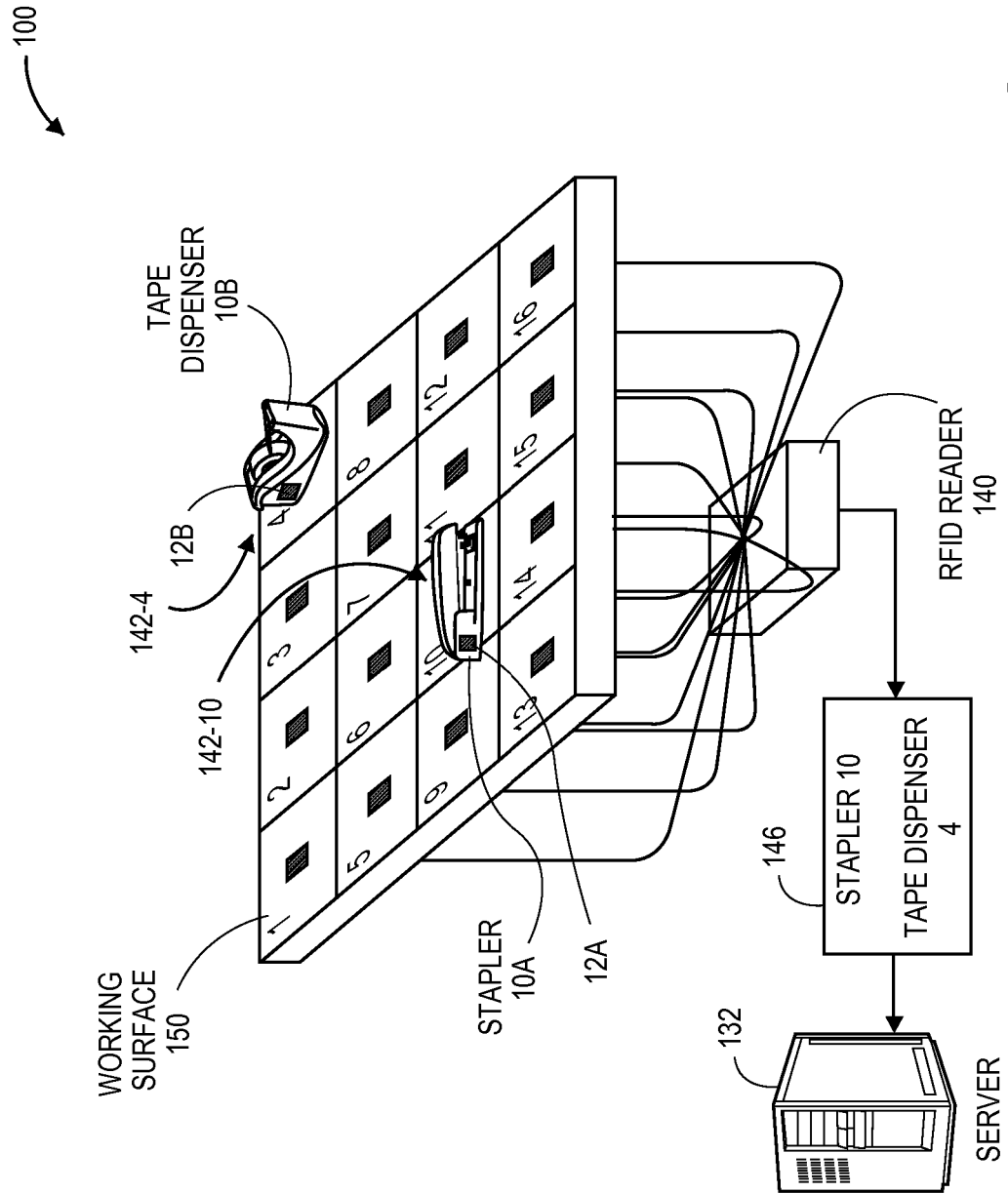

Referring to FIGS. 1A and 1B, a system 100 for tracking locations or conditions of objects using RFID signals in accordance with embodiments of the present disclosure is shown. The system 100 includes a server 132, an RFID reader 140 having sixteen RFID antennas 142-1 through 142-16 and a working surface 152 such as a table, a desk or other working space located within a workstation or working environment. The server 132 is in communication with the RFID reader 140, which is functionally joined to each of the RFID antennas 142-1 through 142-16. As is shown in FIG. 1A, the system 100 further includes a tool 10A (viz., a stapler) and a tool 10B (viz., a tape dispenser). Each of the tools 10A, 10B is adorned with an RFID tag 12A, 12B attached thereto.

In accordance with the present disclosure, the various RFID antennas 142-1 through 142-16 of the system 100 of FIG. 1A may be configured to receive RFID signals from one or more RFID tags, including but not limited to the RFID tags 12A, 12B provided on the tools 10A, 10B. For example, when either of the tools 10A, 10B enter within a functional range of one or more of the RFID antennas 142-1 through 142-16, an RFID signal may be transmitted from the RFID tag 12A, 12B to one or more of the RFID antennas 142-1 through 142-16, and received at the RFID reader 140. Information associated with the RFID signals, including but not limited to an identification of the RFID tag 12A, 12B from which the RFID signals were transmitted, or the RFID antennas 142-1 through 142-16 at which the RFID signals were received, may be provided from the RFID reader 140 to the server 132, and subjected to further processing.

Referring to FIG. 1B, the system 100 is shown, with the tools 10A, 10B placed in one or more discrete locations on the working surface 150. Specifically, the tool 10A is placed on or near the RFID antenna 142-10, and the tool 10B is placed on or near the RFID antenna 142-4. Thus, a first RFID signal is transmitted from the RFID tag 12A on the tool 10A to the RFID reader 140 by way of the RFID antenna 142-10, and a second RFID signal is transmitted from the RFID tag 12B on the tool 10B to the RFID reader 140 by way of the RFID antenna 142-4. Accordingly, information 146 regarding the RFID tags 12A, 12B from which the first and second RFID signals were transmitted (e.g., an identifier of the tools to which each of the RFID tags 12A was attached), and regarding the RFID antennas 142-10, 142-4 at which the first and second RFID signals were received may be provided from the RFID reader 140 to the server 132, and subjected to further processing.

Therefore, according to some embodiments of the present disclosure, such as the system 100 of FIGS. 1A and 1B, a location of an object bearing an RFID tag that has been placed on a working surface having a plurality of RFID antennas associated therewith may be determined by receiving an RFID signal from the RFID tag by one of the RFID antennas, and associating the object bearing the RFID tag from which the RFID signal was transmitted with a location of the RFID antenna at which the RFID signal was received. Preferably, each of the RFID antennas is has a limited operational range, even as short as one inch (1"), such that an RFID signal may be isolated or confined to a limited number, e.g., one, of the RFID antennas.

Many workers who perform jobs or complete tasks at a workstation having one or more working surfaces frequently use a number of apparatuses (e.g., tools, utensils, implements, instruments or other like devices) to perform such jobs or complete such tasks. For example, a sandwich maker may slice bread on a cutting board, and prepare a sandwich on a countertop using the bread and one or more cold cuts or condiments. Similarly, around the holidays, a department store clerk may wrap purchased gifts using wrapping paper stored in rolls, tape or other fasteners provided in dispensers, and bows or ribbons stored in boxes or bags. Occasionally, however, workers at such workstations may be prone to losing or otherwise misplacing one or more of the apparatuses. Particularly where such jobs or tasks require the use of small handheld tools or other devices, or where such tools or devices are used alongside with ingredients, accessories or raw materials, the likelihood that a worker may lose track of one or more of his or her tools or apparatuses is apparent, as the tools or devices may be concealed from view, discarded accidentally, or borrowed or otherwise taken from the workstation by another worker.

Existing systems and methods for identifying and tracking tools or other devices that are provided or used at a workstation have a number of inherent limitations. For example, such tools or devices may be marked with a label or marking that associates the tools or devices with a specific workstation, or with a specific worker. Frequently, however, such labels or markings may be concealed or ignored, either intentionally or inadvertently, by the specific worker or another worker who uses the tools or devices and fails to return them to their intended locations. Additionally, such tools or devices may be bound to the workstation using a tether formed from string, rope and chains or like tensile elements. The tether may limit a worker's range of motion when using the tools or devices, or may get in the way of other tools or devices in use at the workstation, or otherwise hamper the work being performed there.

Additionally, in many environments where items of various sizes, shapes or dimensions may arrive, or through which such items may pass, enabling workers to quickly and accurately record information regarding a status or condition of one or more of the items may be desired. For example, as a variety of pieces of luggage circulate through an airport or other transportation facility, or as a number of containers travel through a fulfillment center, a worker who recognizes a particular problem or deficiency regarding one of such items may frequently desire to capture information regarding the item and the problem or deficiency, as well as a time at which the problem or deficiency was recognized. Currently, however, in order to ensure that the item is properly identified and that the information regarding the problem or deficiency is properly recorded, the item must removed from the conveyor or other transportation system by which the item is traveling, the information must be recorded by hand (e.g., on paper) or using a computer device, and the item must be returned to the conveyor or transportation system or routed for processing. Thus, existing systems and methods for capturing information regarding a condition of an object naturally lead to delays in the transportation of the object, or of multiple objects, and occasionally fail to capture relevant details regarding the object or the condition thereof.

RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The systems and methods of the present disclosure are directed to tracking locations or conditions of objects using RFID signals. Specifically, an object may be tagged with one or more RFID tags or other transmitting devices, and a number of RFID antennas may be evenly distributed in discrete locations across a working surface or other area where the object is to be operated, handled or processed. When the object arrives within a predefined range of one of the RFID antennas, an RFID signal is transmitted from one or more of the RFID tags on the object to one of the RFID antennas, and subsequently to an RFID reader, which may recognize the object from which the RFID signal was transmitted, as well as the discrete location of the RFID antenna at which the RFID signal was received. In this regard, a location of the object on the working surface may be determined based on the discrete location of the RFID antenna, and effectively pinpointed to within an operational range of the RFID antenna. Alternatively, where an RFID signal is not received from an RFID tag associated with a given object by any of the RFID antennas, the systems and methods of the present disclosure may effectively confirm the given object is not located on the working surface in accordance with the present disclosure.

Therefore, the systems and methods of the present disclosure may ensure the proper tracking of items such as tools, utensils, implements, instruments or other apparatuses on a working surface of a workstation based on the RFID signals received at one or more RFID antennas disposed on the working surface. By embedding at least one RFID tag within each of the items, and by determining a discrete location of each of the RFID antennas on the working surface, the locations of the items may be identified based on information regarding an RFID signal, including the RFID tag from which the RFID signal was transmitted or the RFID antenna at which the RFID signal was received. In this regard, the precise location of an item on the working surface may be determined to within a level of accuracy defined by an operational range of the RFID antenna based on the RFID signal received at the RFID antenna or an indication that the item is not located on the working surface may be stored in at least one data store if an RFID signal is not received from any of the RFID tags provided on the item. Thus, some embodiments of the systems and methods disclosed herein not only aid in locating items on a working surface but also enable an inventory of such items to be taken, which may thereby determine whether each of the items is in an intended location on the working surface, and identify which of such items is not.

According to some embodiments of the present disclosure, the placement of the RFID antennas on the working surface may be specifically selected in order to eliminate or minimize the effects of the overlapping of operational ranges of the respective RFID antennas, such that an RFID tag provided on an object may transmit signals to only one RFID antenna at a time. Alternatively, according to some other embodiments of the present disclosure, in the event of an overlap of RFID antenna operational ranges which results in an RFID signal being transmitted from an RFID tag provided on an object to two or more RFID antennas at the same time, the object may be associated with a location of the RFID antenna at which the intensity of the RFID signal is strongest. According to still other embodiments of the present disclosure, where an RFID signal is received from an RFID tag provided on an object by two or more RFID antennas at the same time, the object may be associated with a midpoint between the locations of the RFID antennas, or at a prorated or extrapolated position between such locations.

RFID antennas may be provided on any type of working surface having any size, shape or orientation in accordance with the present disclosure. For example, the working surfaces may be shaped in the form of substantially planar circles, rectangles, triangles, parallelograms or any other polygonal shape, as well as curved or elliptical surfaces. Additionally, the working surfaces may be provided on substantially horizontal surfaces, substantially vertical surfaces, or surfaces provided at any orientation. Furthermore, the working surface may be solid or may feature one or more breaks or perforations. For example, the working surface may be a perforated hardboard having a plurality of holes for accepting one or more pegs or hooks thereon. Therefore, one or more RFID antennas may be provided on the perforated hardboard for the purpose of identifying the pegs or hooks onto which an object bearing an RFID tag may be located based at least in part on an RFID signal transmitted from the RFID tag to one of the RFID antennas.

Moreover, the RFID antennas may be provided on a working surface in any manner. For example, the RFID antennas may be physically embedded into at least a portion of the working surface, e.g., into one or more other layers, or applied thereon by any means, such as by any type or form of adhesive. Alternatively, the RFID antennas may be provided on one or more layers of a flexible substrate of any suitable material, e.g., cloth, paper, plastic or rubber, or between two or more of such layers, and the flexible substrate may be provided on any type or form of working surface in a manner that permits an object bearing an RFID tag to be associated with a location of one or more of the RFID antennas based on an RFID signal. According to some embodiments of the present disclosure, the flexible substrate may be provided on a fixed surface, a mobile surface, a wearable surface, or any other type or form of device or apparatus.

Additionally, in accordance with some other embodiments of the present disclosure, a plurality of specially purposed RFID tags may be provided on an external surface of an object, with each of the RFID tags being associated with an indicator or an aspect of a condition of the object. Preferably, each of the specially purposed RFID tags is associated with a positive indication, or a "TRUE" Boolean value, such that when an RFID signal is received from such a specially purposed RFID tag, the indicator or the aspect of the condition of the object is present and currently relevant. The specially purposed RFID tags may be covered with blocking or shielding agent or layer that precludes the RFID tags from being energized in the presence of a nearby RFID antenna or RFID reader. Where a human worker or machine recognizes that the indicator or the aspect of the condition of the object is not present or is not currently relevant, the worker or machine may tear off or otherwise remove the blocking or shielding agent or layer from a specially purposed RFID tag associated with the indicator or the aspect of the condition, thereby enabling the RFID tag to be energized by a nearby RFID antenna or RFID reader, and to transmit the positive or "TRUE" RFID signal to the RFID antenna or RFID reader.

Alternatively, each of the specially purposed RFID tags may be associated with a negative indication, or a "FALSE" Boolean value, such that when an RFID signal is received from a specially purposed RFID tag, the indicator or the aspect of the condition of the object associated with that RFID tag is neither present nor currently relevant. Where a human worker or machine recognizes that the indicator or the aspect of the condition is present, or has become relevant, the worker or the machine may apply a blocking or shielding agent or layer over the specially purposed RFID tag associated with the aspect of the condition that is recognized as being present or having become relevant, thereby blocking or shielding any electromagnetic fields or energy from reaching the specially purposed RFID tag.

The blocking or shielding agents or layers of the present disclosure may be formed from any flexible and suitable material that can temporarily hinder the passage of electromagnetic energy or fields therethrough, thereby precluding such energy or fields generated by the RFID antenna from triggering an RFID signal from the specially purposed RFID tag. For example, the blocking or shielding agents or layers may be formed of thermoplastic polymers such as polyethylene terephthalate, sometimes referred to as "PET" or "PETE," including but not limited to biaxially oriented PETE films which may be metallized or nonmetallized, e.g., flexible films sold under the Mylar® trade name, and may be backed with one or more adhesive liners. The blocking or shielding agents or layers may thus be releasably applied to the object in a manner that obscures the specially purposed RFID tag, and prevents the obscured tag from transmitting an RFID signal, even in the presence of an electromagnetic field or energy source provided by way of an RFID antenna associated with an RFID reader. Thus, an RFID tag may be applied as pre-shielded, i.e., as covered, shrouded or wrapped in blocking or shielding agents or layers, thereby precluding the RFID tag from being energized by an RFID antenna or RFID reader and transmitting an RFID signal until the blocking or shielding agents or layers are partially or entirely removed. Alternatively, an RFID tag may be applied as uncovered or unobstructed, and capable of being energized by an RFID antenna or RFID reader and transmitting an RFID signal, until a blocking or shielding agent or layer is applied thereover.

Figure 2:
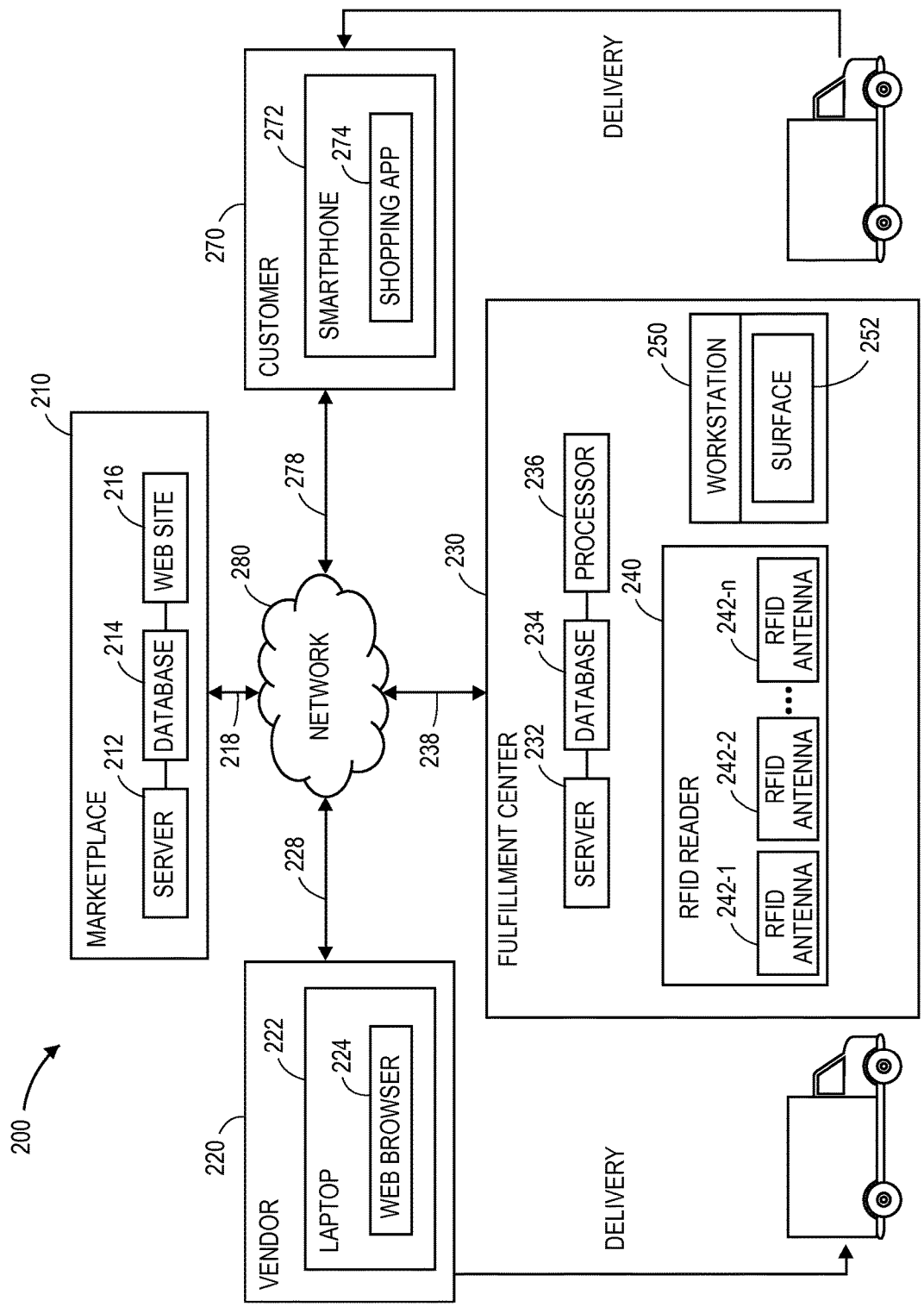
FIG. 2 is a block diagram of components of one system for tracking locations or conditions of objects using RFID signals in accordance with embodiments of the present disclosure.

Referring to FIG. 2, a block diagram of components of one system 200 for tracking locations or conditions of objects using RFID signals in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes at least one RFID reader 240 having a plurality of n antennas 242-1, 242-2 . . . 242-n, as well as at least one workstation 250 having at least one working surface 252.

The RFID reader 240 is any type of sensor or interrogator that may be provided for use in connection with signals transmitted from one or more active or passive RFID tags. The RFID reader 240 may include one or more components for transmitting or receiving signals, such as the antennas 242-1, 242-2 . . . 242-n associated with the working surface 252, as well as various circuitry components for processing and controlling the operation of the RFID reader 240. The antennas 242-1, 242-2 . . . 242-n may be formed of the same integral unit as the RFID reader 240, or operatively connected to one or more components of the RFID reader 240 by way of wired or wireless means.

Preferably, at least one of the plurality of n antennas 242-1, 242-2 . . . 242-n is configured to receive RFID signals from RFID tags located within short operational ranges, e.g., within approximately one inch (1") of one of the plurality of n antennas 242-1, 242-2 . . . 242-n, which may be determined by one or more factors including but not limited to the sensitivity or transmitting power of the RFID reader 240, as well as the relative sizes of the RFID antennas 242-1, 242-2 . . . 242-n with respect to the sizes of the RFID tags. When an RFID signal is received by one of the RFID antennas 242-1, 242-2 . . . 242-n from an RFID tag associated with an object, the object may thus be conclusively determined to be located within the operational range of the RFID antenna by which the RFID signal was received.

Additionally, the RFID reader 240 may communicate with RFID tags by way of any coupling modes or methods that may be known to those of ordinary skill in the pertinent arts. For example, an RFID tag may modulate one or more elements of the data stored thereon, and transmit a modulated data signal to a receiving circuit associated with the RFID reader 240. Subsequently, the RFID reader 240 may then demodulate the data signal, and provide a processed set of data derived from the data signal to the server 232 or another computer device for further processing.

Moreover, the RFID reader 240 may be configured to capture, evaluate, transmit or store any available information regarding signals received from one or more RFID tags, including information regarding any attributes of the signals, including but not limited to sensed signal strengths or intensities, angular directions or ranges to the RFID tags from which such signals were received, any differences between the strengths, intensities, angular orientations or ranges associated with two or more signals, or information or data included in the signals. Although the fulfillment center 230 of FIG. 2 includes a single RFID reader 240, those of ordinary skill in the pertinent arts will recognize that any number of RFID readers 240 may be provided throughout a fulfillment center environment, and in any number of specified stations or locations, in accordance with the present disclosure.

The working surface 252 may be any surface feature at which a worker may perform one or more actions associated with a task, such as a desk, table, workbench, easel, podium or like. The working surface 252 may be provided on a free-standing element, or may be mounted to and extend from a wall or other location at the workstation 250. The working surface 252 may be formed of any shape, such as circles, squares, triangles or rectangles, or from any material, and may be provided in any orientation, e.g., a substantially planar surface or a curved or elliptical surface.

In accordance with the present disclosure, the working surface 252 may include at least some of the plurality of n antennas 242-1, 242-2 . . . 242-n disposed in discrete locations thereon, such that an RFID signal received by one of the n antennas 242-1, 242-2 . . . 242-n disposed thereon may be conclusively determined to be located at the discrete location at which the RFID antenna is located, or within a radius defined by the operational range of the RFID antenna by which the RFID signal was received. Moreover, the working surface 252 may be marked with identifiers (e.g., one or more alphanumeric characters or symbols), grid lines, boundaries or other delineators that define or identify the various discrete locations at which RFID antennas are located thereon. Additionally, at least some of the n antennas 242-1, 242-2 . . . 242-n may be provided in other locations, e.g., mounted above or near one or more portions of the workstation 250.

Moreover, in accordance with some embodiments of the present disclosure, the plurality of n antennas 242-1, 242-2 . . . 242-n may be provided in a flexible substrate formed from one or more suitable materials, e.g., cloth, paper, plastics, rubbers, that may be provided onto the working surface 252 such that an RFID signal transmitted by one or more RFID tags provided on an object and received by one of the plurality of n antennas 242-1, 242-2 . . . 242-*n* may be used to associate the object with a location of the one of the plurality of n antennas 242-1, 242-2 . . . 242-*n* at which the RFID signal was received.

The fulfillment center 230 also includes one or more workers (not shown), who may be any designated personnel tasked with performing one or more tasks within the fulfillment center 230. Such workers may handle or transport items (e.g., any type or form of good, product, media or other tangible consumer article) within the fulfillment center 230, operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the RFID reader 240, the workers, or the various storage facilities and other components of the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of RFID devices or tags in a fulfillment center environment, e.g., RFID tags applied to one or more tools, utensils, implements, instruments or other apparatuses, or to one or more items being received, stored, prepared for delivery or delivered at the fulfillment center, the systems and methods are not so limited. Rather, the systems and methods disclosed herein may be utilized in any environment in which information regarding a physical location of an object bearing an RFID tag, or a condition of the object, must be captured, evaluated or stored, and are particularly useful in environments in which such information must be captured, evaluated or stored relatively quickly, and with a high degree of accuracy, including but not limited to environments in which traditional power supplies are not reliable or may not be readily accessed.

Figure 3:
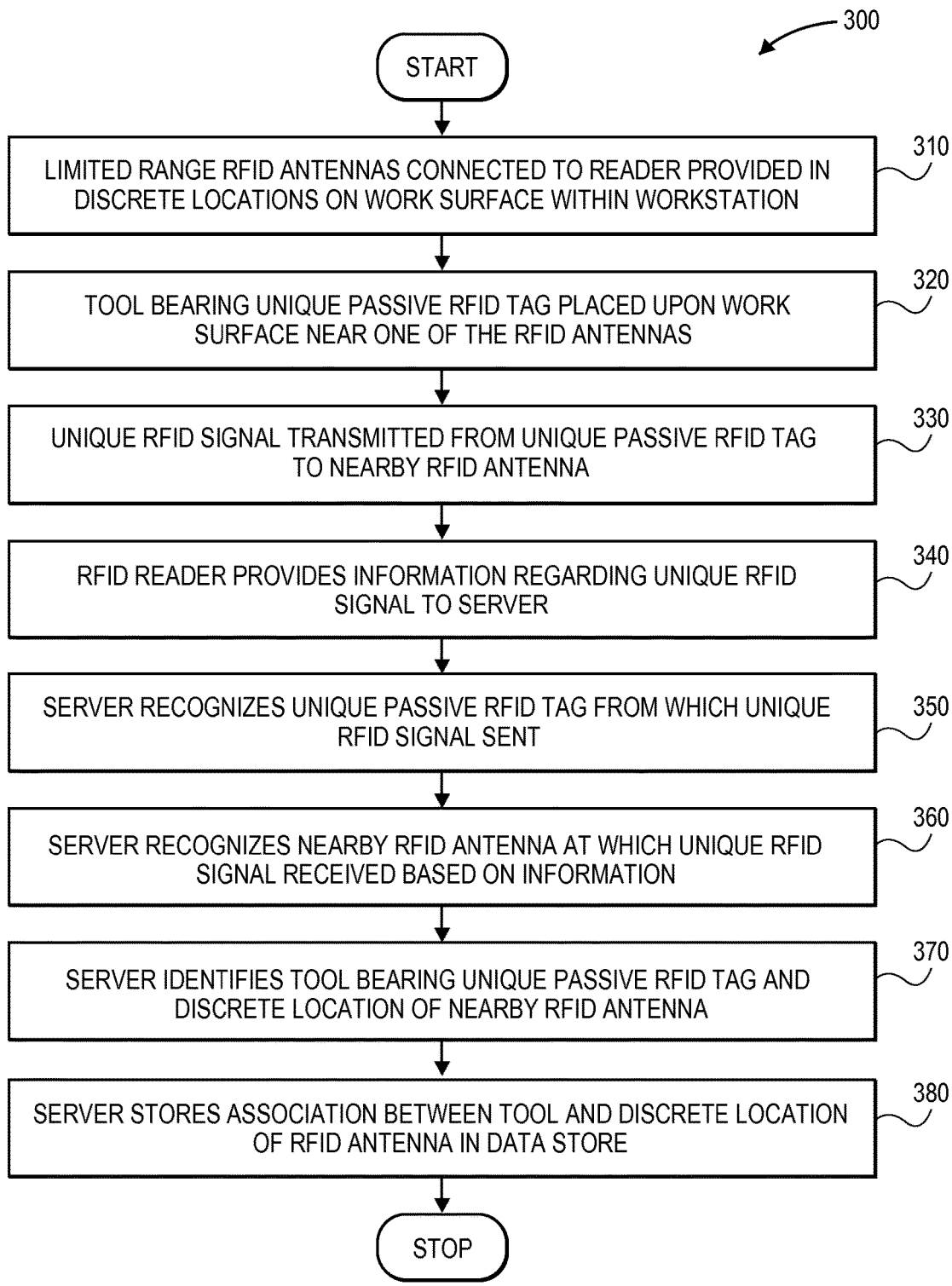
FIG. 3 is a flow chart of one process for tracking locations or conditions of objects using RFID signals in accordance with embodiments of the present disclosure.

As is discussed above, the systems and methods of the present disclosure are directed to providing a plurality of RFID antennas in discrete locations of a working surface at a workstation, and determining locations of objects bearing RFID tags based on RFID signals transmitted from one or more of the RFID tags to one or more of the plurality of RFID antennas, which may have relatively short operational ranges, including ranges of approximately one inch (1"). Thus, when an RFID signal is received by one of the RFID antennas from one or more of the RFID tags, the object bearing the RFID tag from which the RFID signal was transmitted may be assumed to be at a location of the RFID antenna at which the signal was received, or within the operational range of the RFID antenna from that location. Referring to FIG. 3, a flow chart 300 representing one embodiment of a process for tracking locations or conditions of objects using RFID signals in accordance with embodiments of the present disclosure is shown.

At box 310, a plurality of limited range RFID antennas connected to an RFID reader are provided in discrete locations on a work surface within a workstation. For example, referring again to FIG. 1A, the various antennas 142-1 through 142-16 are uniformly distributed throughout the working surface 152 and arranged in a grid-like format, and are functionally linked to the RFID reader 140, which is itself in communication with the server 132. The work surface may have any shape or form and be provided in any orientation. Additionally, the work surface may be substantially planar or curved and provided at any angle. Moreover, the RFID antennas may be provided in the discrete locations on the work surface by any means.

At box 320, a tool bearing a unique passive RFID tag is placed upon the work surface near one of the RFID antennas. For example, referring again to FIG. 1B, the stapler 10A bearing the RFID tag 12A is placed near the RFID antenna 142-10, and the tape dispenser 10B bearing the RFID tag 12B is placed near the RFID antenna 142-4. At box 330, a unique RFID signal is transmitted from the unique passive RFID tag on the tool to a nearby RFID antenna. For example, as is discussed above, where the unique passive RFID tag on the tool is within an operational range of one of the RFID antennas, an RFID signal is transmitted from the unique passive RFID tag to the RFID antenna.

At box 340, the RFID reader provides information regarding the unique RFID signal to a server. The information may include not only an identifier of the tool as associated with the unique passive RFID tag from which the RFID signal was transmitted, but also a time, a date or other metadata associated with the transmission of the RFID signal, and an identifier of the RFID antenna by which the RFID signal was received. At box 350, the server recognizes the unique passive RFID tag from which the unique RFID signal was sent, and at box 360, the server recognizes the nearby RFID antenna at which the unique RFID signal was received, each based on the information provided to the server at box 340. Alternatively, where the unique RFID signal is received by multiple RFID antennas, e.g., where the operational ranges of the RFID antennas overlap, the server may select the RFID antenna at which the RFID signal is sensed with the strongest intensity.

At box 370, the server identifies the tool bearing the unique passive RFID tag from which the RFID signal was transmitted and also the discrete location of the RFID antenna at which the RFID signal was received. The identity of the tool may be determined based on any attribute of the RFID signal, e.g., by resort to a lookup table or other record stored in at least one data store, or expressly identified in at least some of the information or data included in the RFID signal. Similarly, associations between the various RFID antennas and the discrete locations on the work surface at which the antennas are provided may also be maintained in at least one data store, such that the one of the RFID antennas which receives an RFID signal may be readily identified by the RFID reader.

At box 380, the server stores an association between the tool and the discrete location of the RFID antenna in at least one data store, and the process ends. The association may indicate that an RFID signal was received from the unique passive RFID tag provided on the tool at the RFID antenna in the discrete location at a specific time on a given date, and include any other relevant information regarding the tool, the unique passive RFID tag, the discrete location or the RFID reader in accordance with the present disclosure.

In accordance with some embodiments of the present disclosure, a location of an item bearing an RFID tag may be determined based on an RFID signal transmitted by the RFID tag to an RFID antenna in a specific location, to within a level of uncertainty or tolerance defined by the operational range of the RFID antenna at which the RFID signal is received. Referring to FIGS. 4A-4D, components of one system 400 for tracking locations or conditions of objects using RFID signals in accordance with embodiments of the present disclosure are shown. Except where otherwise noted, reference numerals preceded by the number "4" in FIGS. 4A-4D indicate components or features that are similar to components or features having reference numerals preceded by the number "2" in FIG. 2, or by the number "1" in FIG. 1A or 1B, respectively.

Figure 4A:
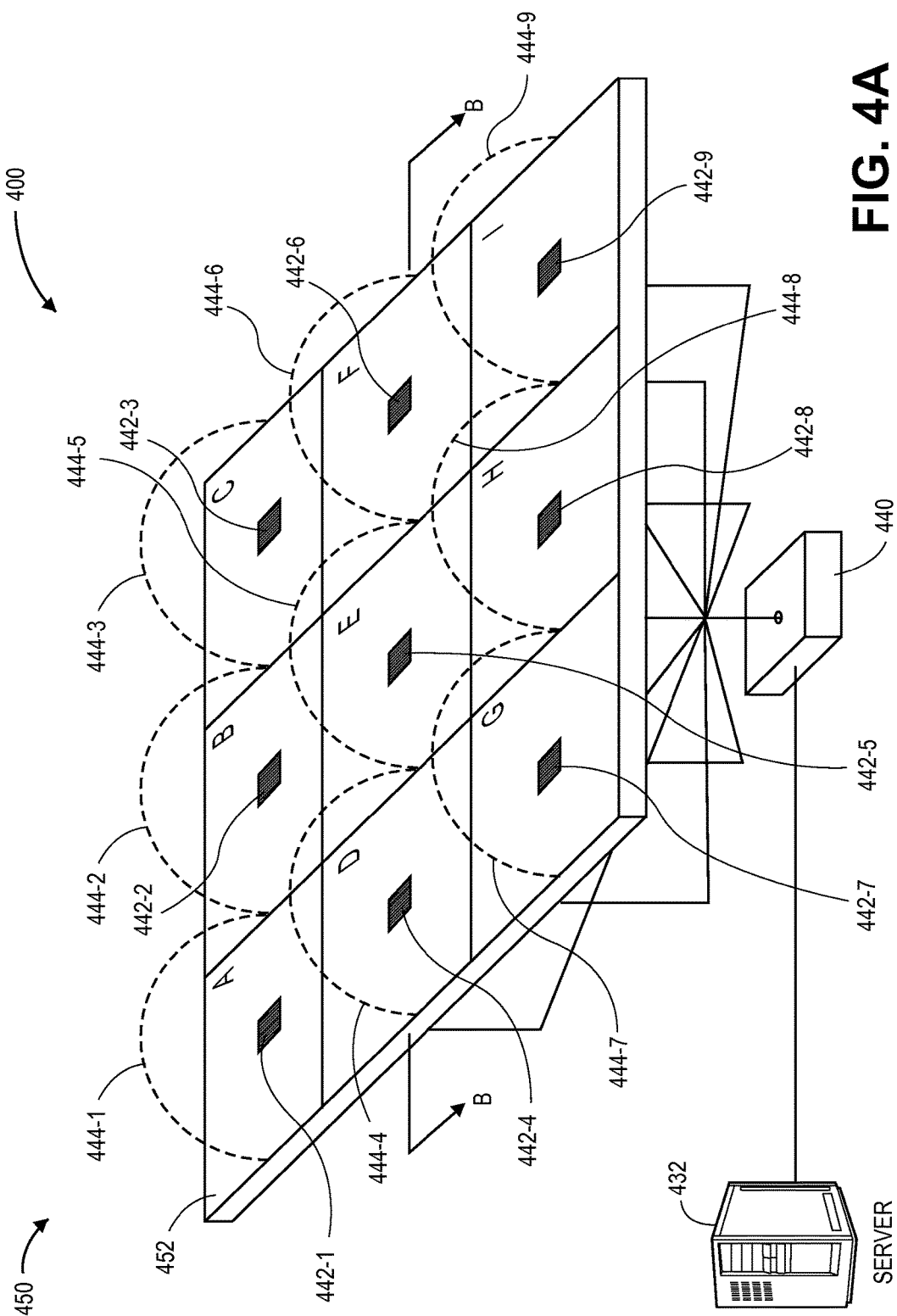

As is shown in FIG. 4A, the system 400 includes a server 432, an RFID reader 440 and a workstation 450 having a working surface 452. Nine RFID antennas 442-1 through 442-9 are provided within the working surface 452 in a grid having nine corresponding spaces, each of which is labeled with a unique identifier (viz., letters A-I). The operational ranges 444-1 through 444-9 of each of the RFID antennas 442-1 through 442-9 are also shown. Each of the RFID antennas 442-1 through 442-9 is connected with the RFID reader 440. Preferably, the operational ranges 444-1 through 444-9 may define hemispheres of radii of approximately one inch (1") in length, although RFID antennas having operational ranges of any length may be utilized in accordance with the present disclosure. As is shown in FIG. 4B, a cross-sectional view of the working surface 452 is shown along the section lines B-B of FIG. 4A. In particular, FIG. 4B shows the operational ranges 444-4, 444-5, 444-6 of the RFID antennas 442-4, 442-5, 442-6.

As is discussed above, in accordance with the present disclosure, the RFID antennas provided in discrete locations on working surfaces may include finite operational ranges which enable a determination of a location of an object bearing an RFID tag, based on an RFID signal transmitted from the RFID tag to one of the RFID antennas. Where the operational ranges of the RFID antennas do not overlap, or overlap to only a minimal extent, a location of the object may be isolated to one of the discrete locations based on the RFID antenna that received the RFID signal. Where the operational ranges of the RFID antennas overlap, however, and the RFID signal is received at multiple RFID antennas, a location of the object may be associated with an RFID antenna at which the RFID signal is received with the strongest intensity, or a location between or among such RFID antennas.

Figure 4C:
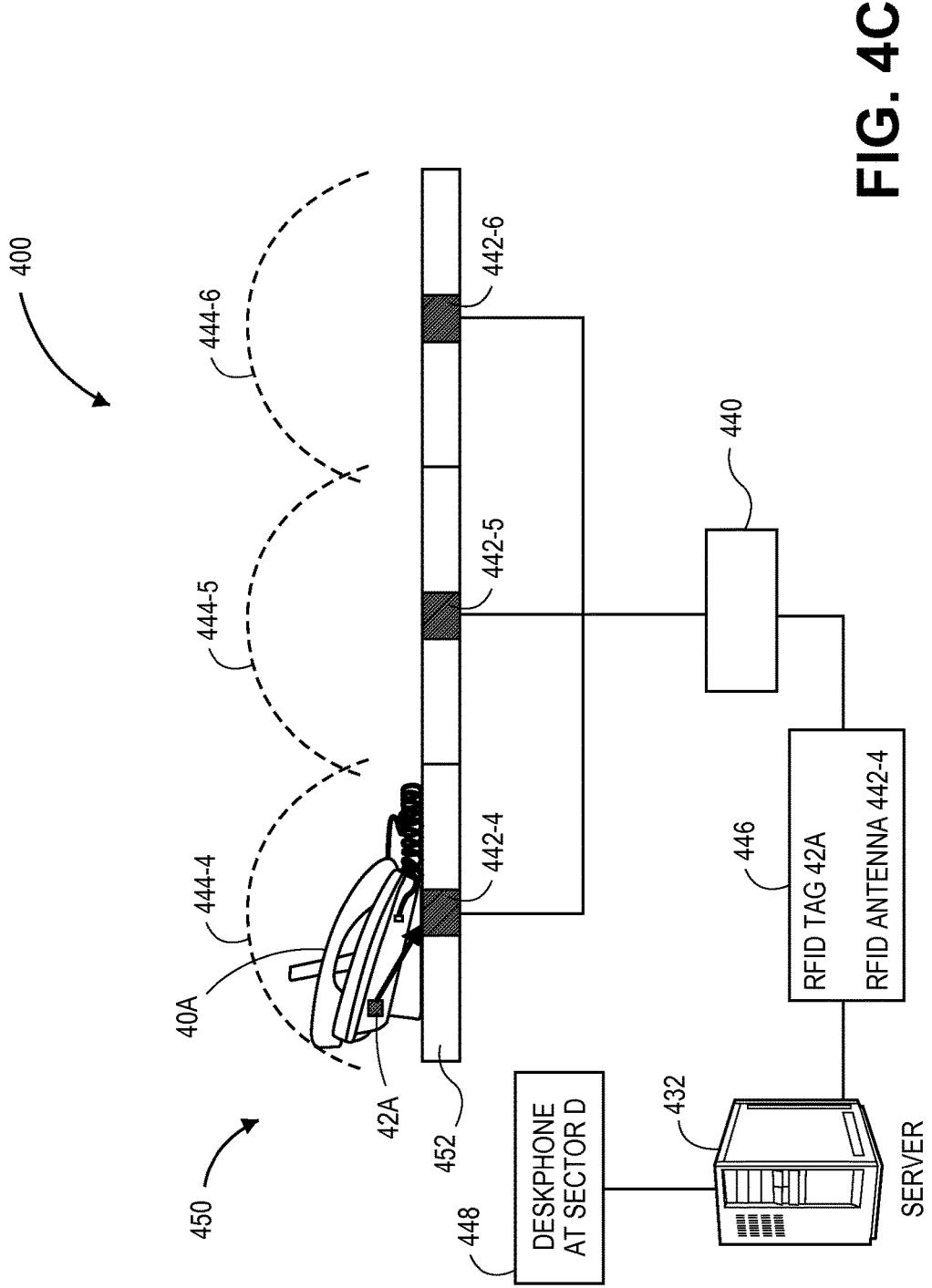

As is shown in FIG. 4C, the cross-sectional view of the working surface 452 of FIG. 4B is shown, with an object 40A bearing an RFID tag 42A placed within a vicinity of the RFID antenna 442-4. Upon receiving an RFID signal transmitted from the RFID tag 42A to the RFID antenna 442-4, the RFID reader 440 may provide information 446 identifying the RFID tag 42A from which the RFID signal was transmitted, and the antenna 442-4 at which the RFID signal was received, to the server 432. The server 432 may, in turn, identify the object 40A based on the RFID tag 42A, and identify the discrete location on the working surface 452 where the object 40A is located, and may store a record 448 identifying both the object 40A and the discrete location in at least one data store.

Figure 4D:
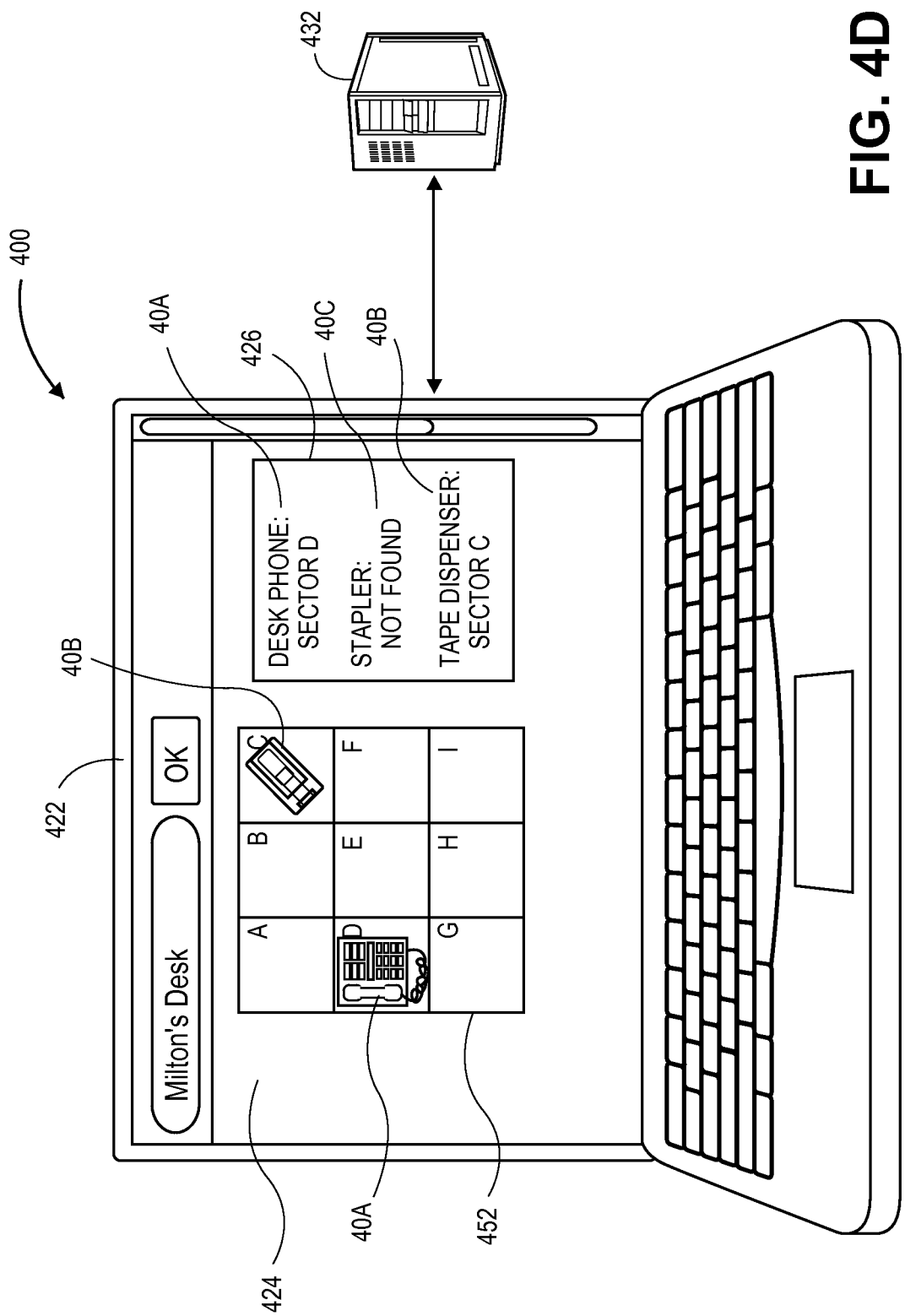

Once a location of an item on a working surface has been determined based on an RFID signal transmitted from an RFID tag provided on the item to an RFID antenna provided on the working surface, information regarding the location of the item on the working surface may be stored and utilized for any purpose. For example, such information may be used to conduct an electronic inventory of the items that are located on a working surface of a workstation, and compared to a list of items that have been assigned to the workstation, as well as the locations on the working surface where each of the items should be located. Referring to FIG. 4D, the system 400 further includes a laptop computer 422 in communication with the server 432. The laptop computer 422 has a user interface 424 displayed on a computer display. The user interface 424 includes a view of an image of at least a portion of the working surface 452 of the workstation 450, showing the object 40A and an object 40B thereon.

Additionally, the user interface 424 further includes a window 426 comprising information regarding the locations of items on the working surface. For example, the window 426 identifies the object 40A as being located in Sector D on the working surface 452, and the object 40B as being located in Sector C on the working surface 452. However, the window also indicates that another object 40C, e.g., a stapler, has not been found anywhere on the working surface 452.

Accordingly, the systems and methods of the present disclosure may be utilized to determine locations of items on a working surface based on RFID signals received from RFID tags associated with such items at RFID antennas provided on or near the working surface, and to store information regarding the locations of such items in at least one data store. The information may be used for any relevant purpose, including to identify not only the items that are located on the working surface, but also the items that are not located on the working surface and should be located there, as well as the locations at which such items should be located.

Moreover, although the working surface 452 of FIG. 4A is shown as having the RFID antennas 442-1 through 442-9 provided in a grid of nine sectors of equally shaped squares, with each of the sectors including one RFID antenna, the systems and methods of the present disclosure are not so limited. Such sectors provided on a working surface may be formed of any of various shapes, including circles, rectangles, triangles or any other non-polygonal shapes. For example, a workbench may include a single dividing line, boundary or other separator demarcating regions on the workbench for "TOOLS" and for "MATERIALS," and include a number of RFID antennas in each of the regions. Similarly, a table at a distribution station may include a first sector for storing damaged items on a temporary basis, e.g., until such items may be removed for repair or disposal, and a second sector for preparing non-damaged items for delivery in the ordinary course of operations.

The working surfaces of the present disclosure may be provided in any shape or form, and the RFID antennas may be associated with the working surface in any manner. For example, the RFID antennas may be hard-mounted, drilled, screwed or bored into at least an upper portion of the working surface. Alternatively, the RFID antennas may be provided in a flexible layer or substrate that may be applied to the working surface, such that the flexible layer or substrate may be associated with the working surface on a temporary or permanent basis, and such that RFID signals may be received from RFID tags associated with objects that may be placed onto the flexible layer or substrate by one or more of the RFID antennas.

Figure 5C:
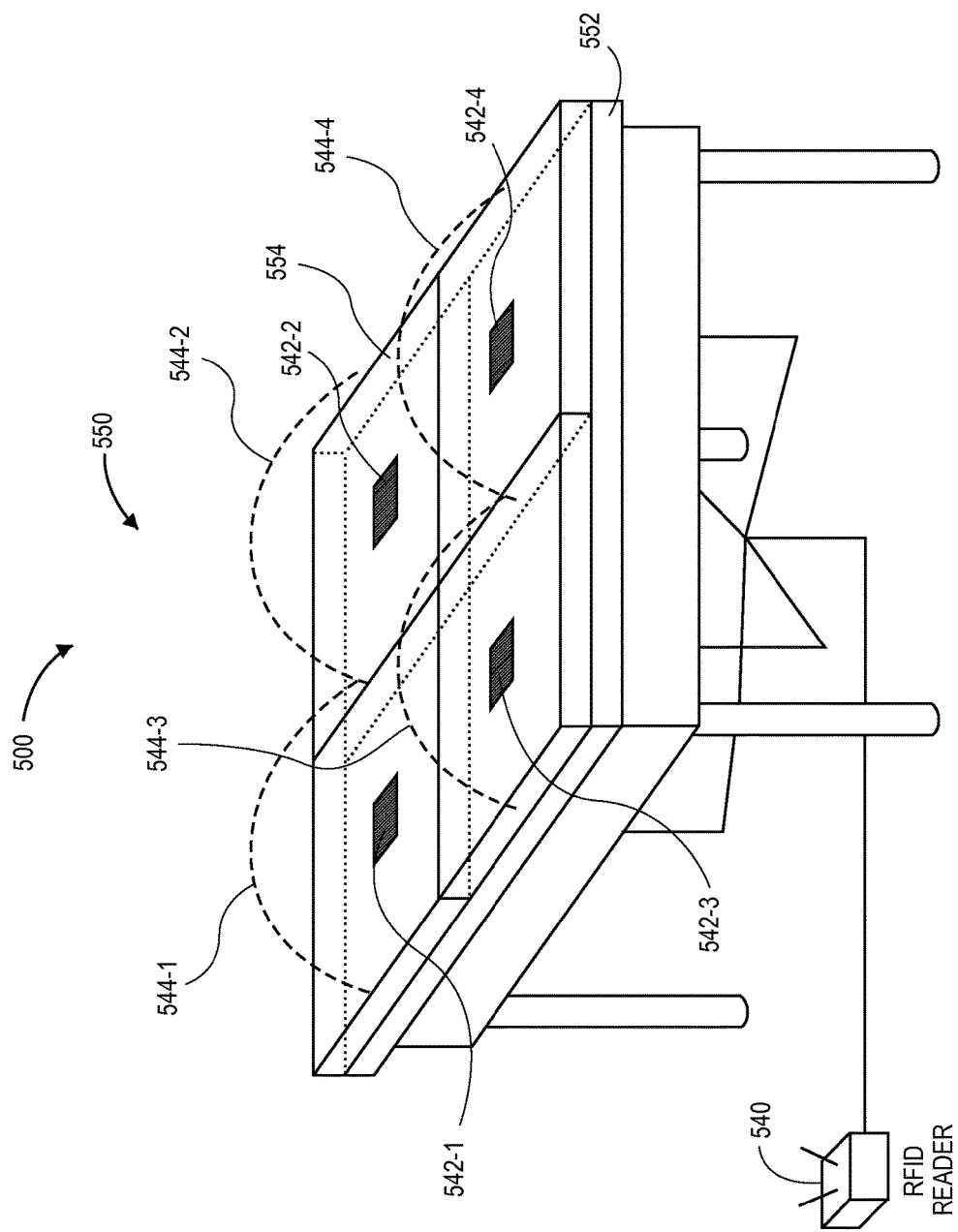

Referring to FIGS. 5A, 5B and 5C, a system 500 including a flexible substrate 554 is shown. Except where otherwise noted, reference numerals preceded by the number "5" in FIGS. 5A-5C indicate components or features that are similar to components or features having reference numerals preceded by the number "4" in FIGS. 4A-4D, by the number "2" in FIG. 2, or by the number "1" in FIG. 1A or 1B, respectively.

The flexible substrate 554 may be any single-layer or multi-layer flexible layer or film that may be manually provided or applied onto a working surface of any size, shape or orientation, including but not limited to fixed, mobile or wearable surfaces, and to which one or more RFID antennas may be affixed or otherwise associated. The flexible substrate 554 may be formed from any suitable material, including any type or form of cloth or paper, as well as plastics or rubbers having any number or type of polymers. For example, the flexible substrate 554 may be provided as a single-layer or multi-layer laminate onto at least a portion of a working surface, and may include one or more adhesive layers or compounds for affixing the flexible substrate 554 to the working surface. Additionally, as is shown in FIG. 5A, the flexible substrate 554 includes four RFID antennas 542-1, 542-2, 542-3, 542-4 provided in discrete sectors. The RFID antennas 542-1, 542-2, 542-3, 542-4 may be provided to one of the layers of the flexible substrate 554, or between two or more layers of the flexible substrate 554 in accordance with the present disclosure, and functionally connected to an RFID reader 540 by any wired or wireless means.

Referring to FIG. 5B, the flexible substrate 554 of FIG. 5A is shown as being applied to an upper portion of a working surface 552 at a workstation 550. The flexible substrate 554 may be provided in any manner, e.g., unrolled onto or affixed to the working surface by any means. For example, the flexible substrate 554 may be provided with one or more adhesive backings or layers, e.g., a backing or layer having a liner that may be removed prior to applying the flexible substrate 554 to the working surface 552, or one or more liquids or liquid mixtures. Alternatively, the flexible substrate 554 may carry an inherent or artificial static charge that causes the flexible substrate 554 to be adhered to the working surface 552 upon contact. Any type or form of adhesive may be provided for the purpose of maintaining the flexible substrate 554 in contact with the working surface 552 in accordance with the present disclosure.

Referring to FIG. 5C, the flexible substrate 554 is shown as provided on the working surface 552 of the workstation 550. Once the flexible substrate 554 has been applied to the working surface 552, RFID signals may be received from an RFID tag at one or more of the RFID antennas 542-1, 542-2, 542-3, 542-4 having operational ranges 544-1, 544-2, 544-3, 544-4, and a location of an object to which the RFID tag is applied may be determined based on a location of the one or more RFID antennas 542-1, 542-2, 542-3, 542-4 by which the RFID signal is received.

Additionally, as is discussed above, the systems and methods of the present disclosure are also directed to determining a condition of an object having a plurality of specially purposed RFID tags provided thereon. Each of the specially purposed RFID tags may be associated with a particular attribute or element of a condition of the object in a negative manner, such that when the object is within an operational range of an RFID antenna or an RFID reader, each of the specially purposed RFID tags will transmit an RFID signal indicating that the specific element or attribute of the condition of the object is or is not present. For example, a specially purposed RFID tag provided on an object may be configured to transmit a positive or "TRUE" RFID signal indicating that the attribute or the element of the condition of the object is present, or a negative or "FALSE" signal indicating that the attribute or the element of the condition of the object is not present.

Thus, when the object is within an operational range of an RFID antenna or an RFID reader, and a positive or "TRUE" RFID signal is received, or a negative or "FALSE" signal is not received, from one or more of the specially purposed RFID tags, it may be necessarily inferred that the specific element or attribute of the condition is present. Conversely, when the object is within the operational range of the RFID reader, and a positive or "TRUE" RFID signal is not received, or a negative or "FALSE" signal is received, from one or more of the specially purposed RFID tags, it may be necessarily inferred that the specific element or attribute is not present.

Whether a specially purposed RFID tag transmits an RFID signal may be determined through the use of one or more blocking or shielding agents or labels. For example, a specially purposed RFID tag that is configured to transmit a positive or "TRUE" RFID signal regarding a particular attribute or element of a condition of an object may be provided on a surface of the object in a pre-shielded manner, such that the RFID tag is at least partially covered using a blocking or shielding agent or label, e.g., a thermoplastic polymer known to prevent or restrict electromagnetic energy or fields from passing therethrough. When the object is in an expected or satisfactory condition, such that the attribute or element of the condition of the object associated with the RFID tag is not present or relevant, and the pre-shielded RFID tag remains at least partially covered by the blocking or shielding agent or label, the RFID tag does not transmit the positive or "TRUE" RFID signal, even when in a vicinity of an RFID antenna or RFID reader. When the attribute or the element of the condition of the object associated with the RFID tag is present or becomes relevant, however, a human worker or machine may remove the blocking or shielding agent or label therefrom, and the RFID tag may transmit the positive or "TRUE" RFID signal in the presence of an RFID antenna or an RFID reader.

Similarly, a specially purposed RFID tag that is configured to transmit a negative or "FALSE" signal regarding a particular attribute or element of a condition of an object may be provided on a surface of the object. When the object is in an expected or satisfactory condition, such that the attribute or element of the condition of the object associated with the RFID tag is not present or relevant, the RFID tag may transmit the negative or "FALSE" signal to any RFID antenna or RFID reader in a vicinity thereof. When the attribute or element of the condition of the object associated with the RFID tag is neither present nor relevant, however, a human worker or machine may apply a blocking or shielding agent or label thereto, e.g., a flexible layer of a thermoplastic polymer having an adhesive backing or liner, and the capacity of the RFID tag to transmit the negative or "FALSE" signal to any RFID antenna or RFID reader may be eliminated.

Accordingly, the systems and methods disclosed herein are further directed to providing one or more adhesive blocking or shielding agents or labels that may be applied over one or more of the specially purposed RFID tags by a human worker or a machine. When the human worker or machine recognizes a particular attribute or element of a condition of an object that is associated with one of the specially purposed RFID tags, the human worker or machine may apply one of the blocking or shielding labels over the associated specially purposed RFID tag. Thus, when the object enters within an operational range of an RFID reader, an RFID signal will not be transmitted from the blocked or shielded specially purposed RFID tag to the RFID reader, and an implication that the attribute or element of the condition is present may be sensed. Therefore, the systems and methods of the present disclosure enable human workers or machines to report on the conditions of objects in a rapid and effective manner, such that the conditions of such objects may be automatically determined based on the presence or absence of one or more RFID signals transmitted by a plurality of specially purposed RFID signals.

In accordance with the present disclosure, the blocking or shielding agents or labels may be at least partially translucent or transparent, and may contain any number of alphanumeric characters, symbols or other indicia thereon. The characters, symbols or indicia may provide a status as to the attribute or the element of the condition associated with the underlying specially purposed RFID tag. For example, where an RFID tag is configured to transmit a positive or "TRUE" RFID signal, a blocking or shielding agent or label to be applied to the RFID tag may include only a large question mark or other interrogative symbols, characters or indicia, such as a circle with a diagonal line across an interior of the circle. Where an RFID tag is configured to transmit a negative or "FALSE" RFID signal, a blocking or shielding agent or label to be applied to the RFID tag may include only a large exclamation mark or other emphatic symbols, characters or indicia, such a red circle or octagonal outline of a stop sign. The symbols, characters or indicia provided on an RFID label may completely cover any markings on an underlying specially purposed RFID tag, or may only partially obscure the markings on the underlying specially purposed RFID tag.

Figure 6A:
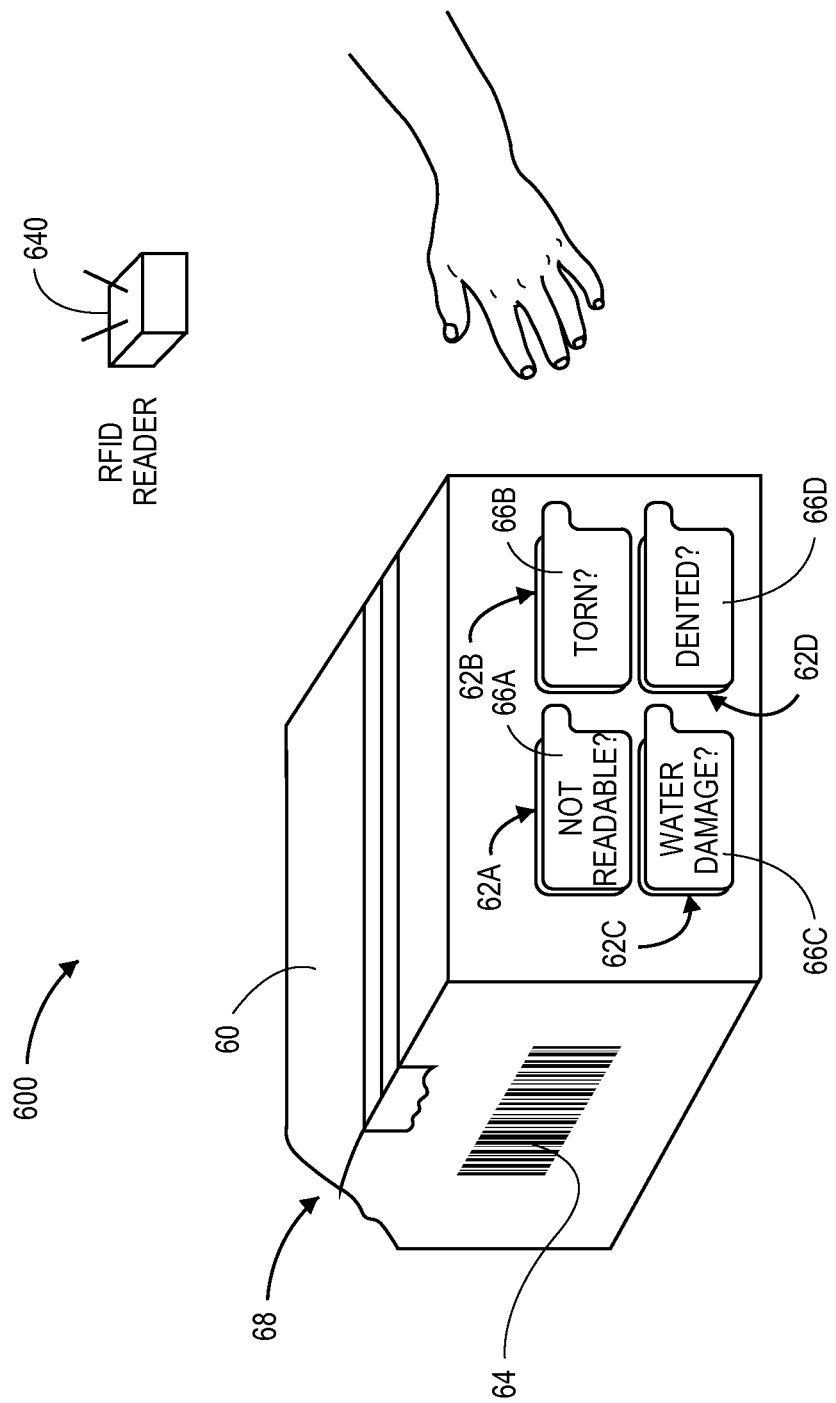
FIGS. 6A and 6B are views of one system for tracking locations or conditions of objects using RFID signals in accordance with embodiments of the present disclosure.
Figure 6B:
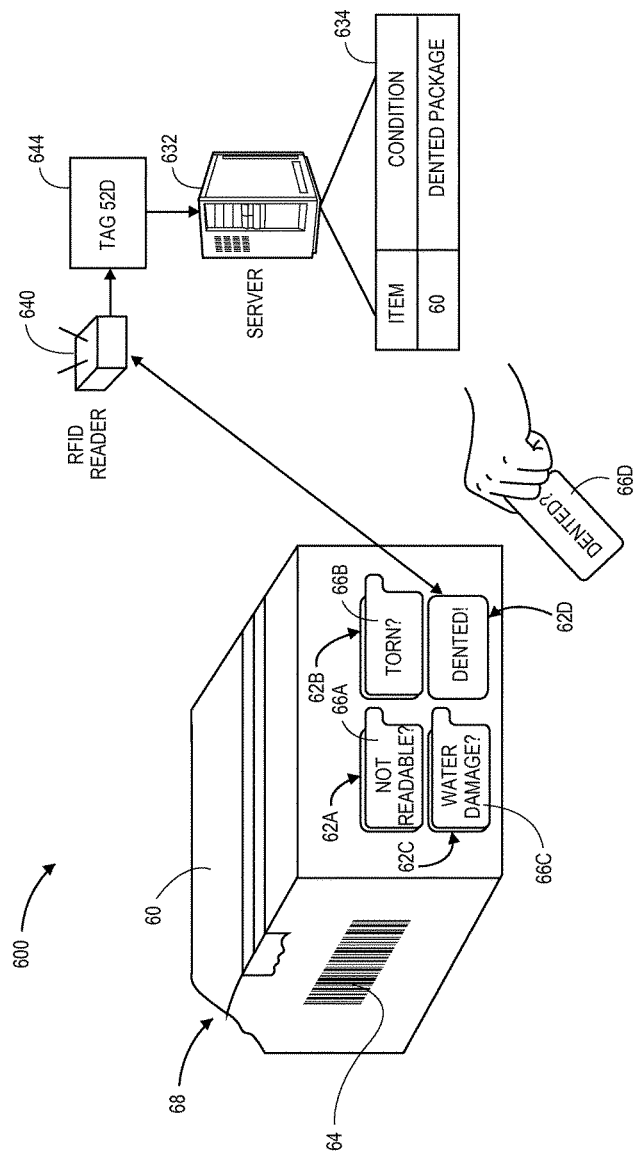

Referring to FIGS. 6A and 6B, views of one system 600 for tracking locations or conditions of objects using RFID signals in accordance with embodiments of the present disclosure are shown. Except where otherwise noted, reference numerals preceded by the number "6" in FIGS. 6A and 6B indicate components or features that are similar to components or features having reference numerals preceded by the number "5" in FIGS. 5A-5C, by the number "4" in FIGS. 4A-4D, by the number "2" in FIG. 2, or by the number "1" in FIG. 1A or 1B, respectively.

The system 600 includes an object (e.g., a parcel) 60 in a vicinity of an RFID reader 640. The object 60 includes a visible dent 68 or other depression on one of the corners of the object 60. As is shown in FIG. 6A, the object 60 includes four RFID tags 62A, 62B, 62C, 62D provided in a matrix or array on one external surface and a bar code 64 provided on another external surface thereof. Each of the four RFID tags 62A, 62B, 62C, 62D corresponds to a different problem, ailment or predicament of the object 60 in a positive manner, such that each of the RFID tags is configured to transmit a positive or "TRUE" RFID signal indicating that the problem, ailment or predicament of the object 60 is present. Additionally, each of the four RFID tags 62A, 62B, 62C, 62D is pre-shielded, e.g., covered with a shielding label 66A, 66B, 66C, 66D, which may be formed from any material that may hinder or restrict electromagnetic energy from passing therethrough and reaching the one of the RFID tags 62A, 62B, 62C, 62D to which the shielding label 66A, 66B, 66C, 66D has been applied, and thereby preventing the shielded one of the RFID tags 62A, 62B, 62C, 62D from transmitting a positive or "TRUE" RFID signal to the RFID reader 640.

For example, the RFID tag 62A may be associated with an unreadable bar code 64, while the RFID tag 62B may be associated with a torn container. The RFID tag 62C may be associated with water damage, and the RFID tag 62D may be associated with a dented container. Thus, when each of the RFID tags 62A, 62B, 62C, 62D is covered by a shielding label 66A, 66B, 66C, 66D, none of the RFID tags 62A, 62B, 62C, 62D may transmit such positive or "TRUE" RFID signals to the RFID reader 640. Therefore, in the absence of any such RFID signals, the object 60 is presumed to have a readable bar code, to not be torn, to not be experiencing water damage or to not be dented.

Additionally, each of the shielding labels 66A, 66B, 66C, 66D may be marked with alphanumeric characters or text indicative of the attribute or element of the condition associated with the RFID tag 62A, 62B, 62C, 62D covered by each of shielding labels 66A, 66B, 66C, 66D. For example, as is shown in FIG. 6A, each of the shielding labels 66A, 66B, 66C, 66D is labeled with words corresponding to the attributes or elements of the condition of the object 60 with which the RFID tags 62A, 62B, 62C, 62D are associated in an interrogative manner, including "NOT READABLE?" "TORN?" "WATER DAMAGE?" and "DENTED?" respectively.

As is shown in FIG. 6B, the shielding label 66D has been removed from the RFID tag 62D, which is associated with a dented condition of the object 60. Thus, with the shielding label 66D removed from the RFID tag 62D, the object 60 is capable of transmitting an RFID signal indicative of the lack of the shielding label 66D to the RFID reader 640, e.g., from the RFID tag 62D. In accordance with the present disclosure, the RFID reader 640 may be configured to recognize that an RFID signal was received from the RFID tag 62D, and that RFID signals were not received from the RFID tags 62A, 62B, 62C. The RFID reader 640 may transmit information 644 regarding the RFID tag 62D from which the RFID signal was received to a server 632, which may store information 634 regarding a condition of the object 60 based on the RFID signal, viz., that the object 60 has a dented package. The object 60 may be identified and associated with the RFID signal received from the RFID tag 62D by various means. For example, the bar code 64 may be scanned or read using one or more imaging devices or other sensors (not shown). Likewise, another RFID tag (not shown) provided on another surface of the object 60 for the purpose of identifying the object 60 may transmit an RFID signal to the RFID reader 640. Once the object is identified based on the reading of the bar code 64 or the RFID signal received at the RFID reader 640, the object 60 may be associated with the RFID signal received from the RFID tag 62D, and with the problem, ailment or predicament associated therewith. Moreover, when the shielding label 66D is removed from the RFID tag 62D, a label of the attribute or element of the condition associated with the RFID tag 62D is displayed in an affirmative manner, viz., "DENTED!"

Alternatively, where an RFID tag is configured to transmit a negative or "FALSE" RFID signal regarding an absence of a particular problem, ailment or predicament at the object 60, the symbols, characters or indicia on the shielding labels and underlying RFID tags may be substantially reversed as compared to the symbols, characters or indicia on the shielding labels 66A, 66B, 66C, 66D and underlying RFID tags 62A, 62B, 62C, 62D shown in FIG. 6A and FIG. 6B. For example, an uncovered RFID tag configured to transmit a negative or "FALSE" RFID signal may be provided with words associated with an attribute or an element of the condition of the underlying object in an interrogative manner, e.g., with a question mark. The RFID tag may be covered with a specific shielding label that includes the same words expressed in an affirmative manner, e.g., with an exclamation point, or a generic shielding label that does not include any words.

Therefore, the systems and methods of the present disclosure may be utilized to rapidly identify the status of items based on the presence or absence of RFID signals received from RFID tags associated with a unique purpose. Where RFID signals are received from each of such tags as expected, e.g., where each of the RFID tags is configured to transmit a negative or "FALSE" signal regarding a particular attribute or element of a condition of an object, or are not received from each of such tags as expected, e.g., where each of the RFID tags is configured to transmit a positive or "TRUE" RFID signal regarding a particular attribute or element of a condition of an object, the item may be determined to be in a satisfactory condition, or at least a condition that does not include or feature any of the problems, ailments or predicaments that has been expressly associated with one of the RFID tags. Where RFID signals are not received from one or more RFID tags configured to transmit negative or "FALSE" RFID signals, or where RFID signals are received from one or more RFID tags configured to transmit positive or "TRUE" RFID signals, the item may be determined to be experiencing one or more problems, ailments or predicaments associated with the RFID tags from which an RFID signal was received or was not received as expected.

Figure 7:
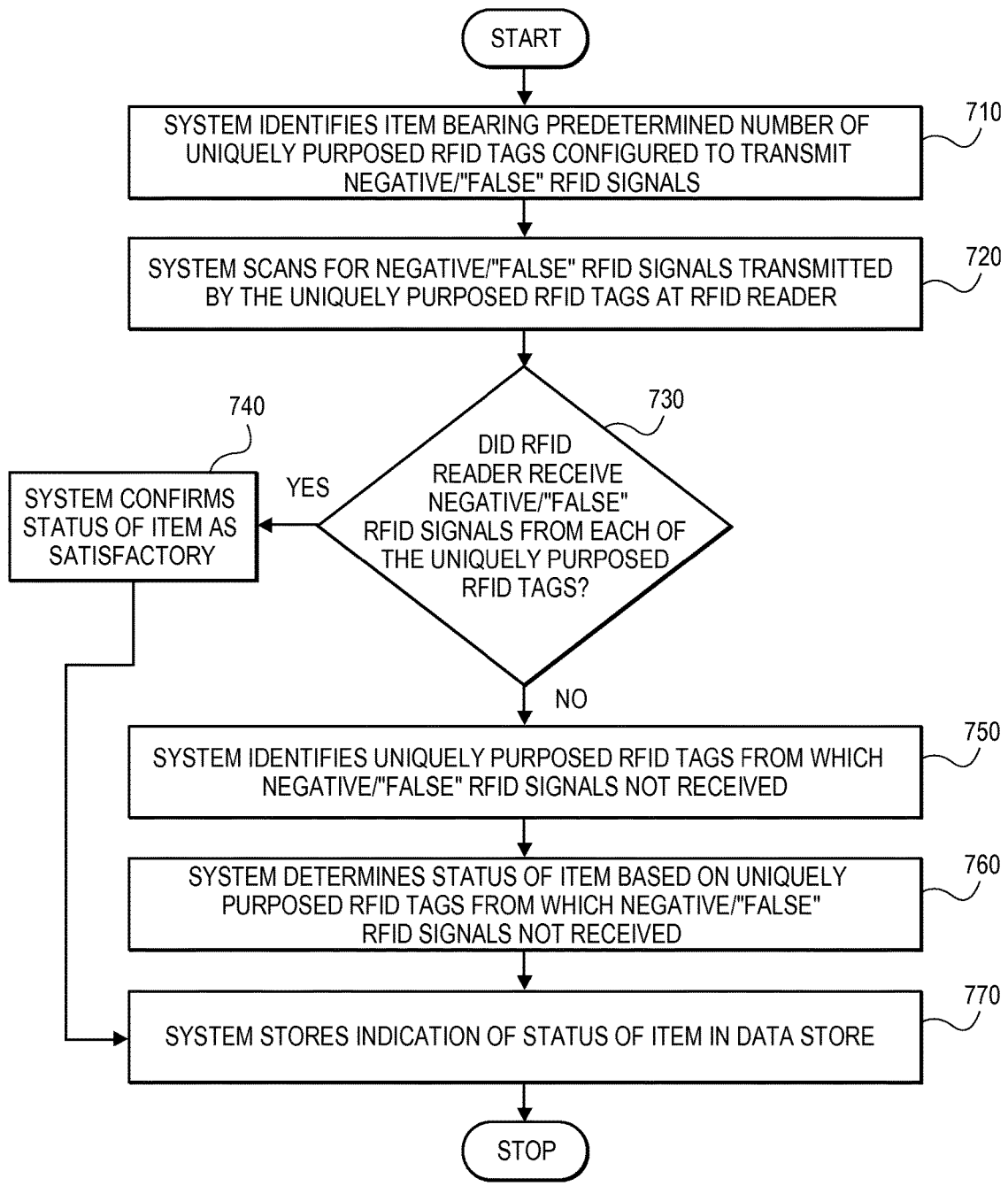
FIG. 7 is a flow chart of one process for tracking locations or conditions of objects using RFID signals in accordance with embodiments of the present disclosure.

Referring to FIG. 7, a flow chart 700 of one process for tracking locations or conditions of objects using RFID signals in accordance with embodiments of the present disclosure is shown. At box 710, a system identifies an item bearing a predetermined number of uniquely purposed RFID tags that are configured to transmit negative or "FALSE" RFID signals. The system may identify the item on any basis, such as by receiving an RFID signal from an RFID tag provided on the item for this purpose, or by locating and interpreting an identifier such as a bar code or other marking provided thereon. Additionally, the uniquely purposed RFID tags may be uniformly or consistently provided on each of a plurality of items, such that each of the plurality of items includes a common set of the uniquely purposed RFID tags.

At box 720, the system scans for negative or "FALSE" RFID signals transmitted by the uniquely purposed RFID tags at an RFID reader. The RFID signals may be sensed at an RFID antenna associated with the RFID reader when the item enters within an operational range of the RFID antenna.

At box 730, the system determines if the RFID reader received negative or "FALSE" RFID signals from each of the uniquely purposed RFID tags. If negative or "FALSE" RFID signals were received from each of the uniquely purposed RFID tags, then the process advances to box 740, where the system confirms a status of the item as satisfactory. As is discussed above, the negative or "FALSE" RFID signal may be transmitted from an RFID tag when the item enters within an operational range of an RFID reader. Therefore, if the RFID reader received negative or "FALSE" RFID signals from each of the uniquely purposed RFID tags, as expected, then it may be confirmed that the item is in a satisfactory condition, and is not plagued by any problems, ailments or predicaments associated with any of the RFID tags.

If the system did not receive negative or "FALSE" RFID signals from each of the uniquely purposed RFID tags, then the process advances to box 750, where the system identifies one or more uniquely purposed RFID tags from which a negative or "FALSE" RFID signal was not received, and to box 760, where the system determines a status of the item based on the uniquely purposed RFID tags from which a negative or "FALSE" RFID signal was not received. At box 770, the system stores an indication of a status of the item in a data store, as determined based on the uniquely purposed RFID tags from which negative or "FALSE" RFID signals were not received, and the process ends.

As is discussed above, a blocking or shielding agent may be applied over one or more specially or uniquely purposed RFID tags provided on an object by a human worker or machine in order to prevent the specially or uniquely purposed RFID tags from being energized by an RFID reader, and from transmitting an RFID signal to the RFID reader. For example, each of the specially or uniquely purposed RFID tags may be associated with a specific element or attribute of a condition of the object in a negative manner, such that a negative or "FALSE" RFID signal received from one of the RFID tags indicates that the element or attribute of the condition is not present. Thus, when the blocking or shielding agent is applied over one of the specially or uniquely purposed RFID tags, and the RFID tag to which the agent is applied may not be energized, a negative or "FALSE" RFID signal is not transmitted by the RFID tag, and it may be inferred that the element or attribute of the condition associated with the specially or uniquely purposed RFID tag is present.

Figure 8:
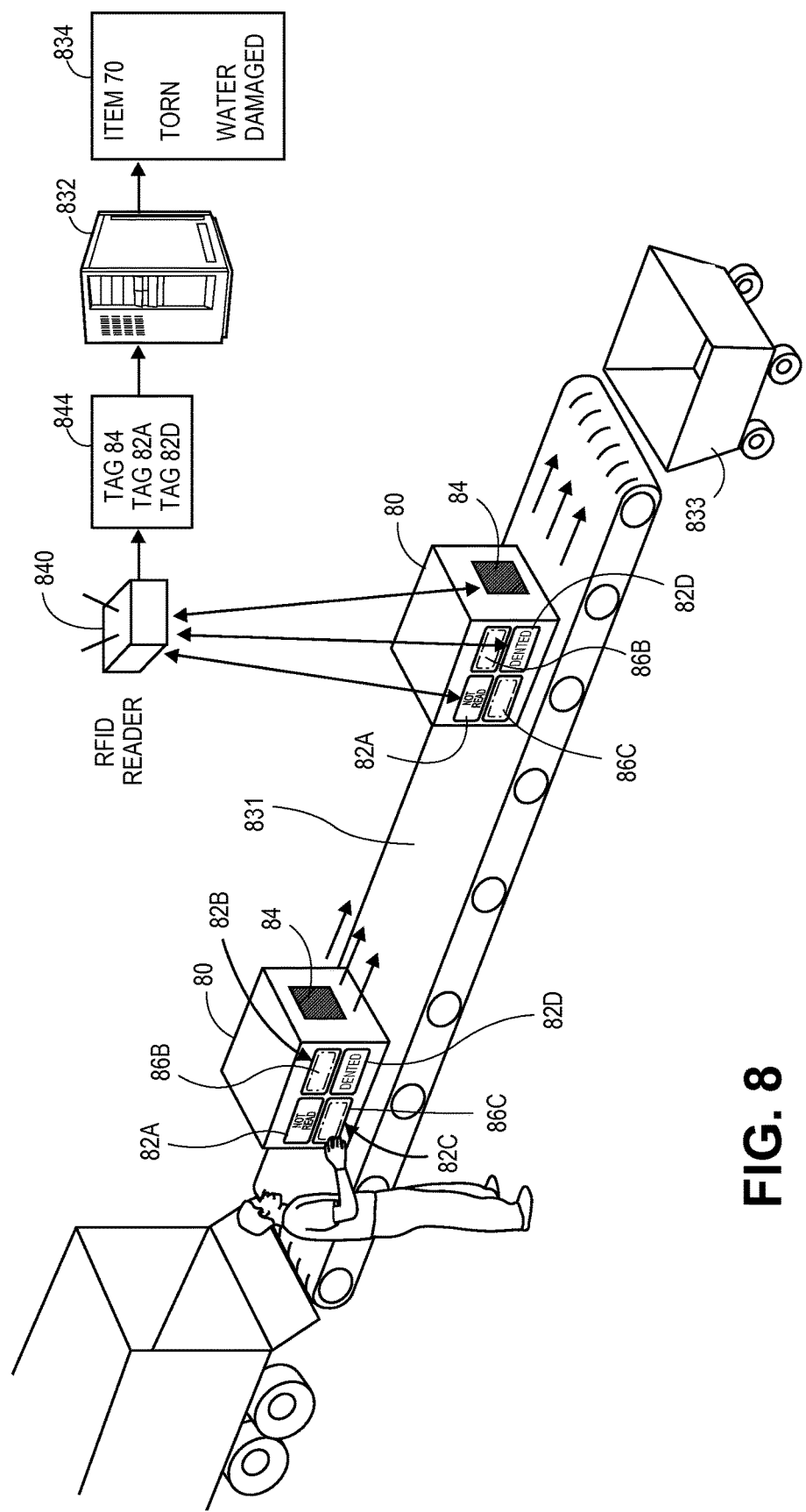
FIG. 8 is a view of one system for tracking locations or conditions of objects using RFID signals in accordance with embodiments of the present disclosure.

Referring to FIG. 8, a system 800 for tracking locations or conditions of objects using RFID signals in accordance with embodiments of the present disclosure is shown. Except where otherwise noted, reference numerals preceded by the number "8" in FIG. 8 indicate components or features that are similar to components or features having reference numerals preceded by the number "6" in FIGS. 6A and 6B, by the number "5" in FIGS. 5A-5C, by the number "4" in FIGS. 4A-4D, by the number "2" in FIG. 2, or by the number "1" in FIG. 1A or 1B, respectively.

As is shown in FIG. 8, the system 800 includes an object (viz., a parcel) 80, a conveyor 831, a server 832 and an RFID reader 840. The object 80 includes a plurality of specially purposed RFID tags 82A, 82B, 82C, 82D provided in a matrix or an array and an identifying RFID tag 84 on surfaces thereof. Each of the specially purposed RFID tags 82A, 82B, 82C, 82D is associated with a specific problem, ailment or predicament and configured to transmit a negative or "FALSE" RFID signal regarding the presence of the problem, ailment or predicament at the object 80.

As is also shown in FIG. 8, a worker placed a blocking or shielding label 86B, 86C onto the specially purposed RFID tags 82B, 82C on the object 80. Therefore, when the object 80 passes within a vicinity of the RFID reader 840, RFID signals are transmitted from the identifying RFID tag 84 and from the specially purposed RFID tags 82A, 82D to the RFID reader 840, but not from the specially purposed RFID tags 82B, 82C. The RFID reader 840 then transmits information 844 regarding the RFID tags 84, 82A, 82D from which RFID signals were received to the server 832, and the server 832 may then identify the item 80 and the problems, ailments or predicaments plaguing the item 80 based on the RFID signal received from the RFID tag 84, and the failure to receive RFID signals from the RFID tags 82B, 82C. Information 834 regarding the item 80 and a condition thereof may be stored in at least one data store.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as being utilized in a fulfillment center environment, e.g., wherein one or more RFID tags, RFID readers or other RFID devices are provided on objects, machines or structures within a fulfillment center, the systems and methods disclosed herein are not so limited, and may be provided in connection with objects, humans, machines or structures in any environment.

For example, although some of the embodiments disclosed herein include horizontal or substantially horizontal working surfaces, those of ordinary skill in the pertinent art will recognize that any type, form or shape of working surface may be associated with any number of RFID antennas and provided in accordance with the present disclosure. Some such working surfaces may includes desks, tables or like work surfaces, as well as walls, pegboards, shelving station or other vertical or substantially vertical surfaces. Moreover, the working surfaces of the present disclosure need not include firm, structural elements. Rather, those of ordinary skill in the pertinent art will recognize that any type of surface may be provided and associated with one or more RFID antennas, including rounded or curved surfaces as well as flexible mats or sheets that may be unrolled onto a substantially horizontal surface or hung from or in front of a substantially vertical surface.

Moreover, although some of the embodiments of the present disclosure reference the use of specially or uniquely purposed RFID tags having a negative connotation or a "FALSE" signal associated therewith, the systems and methods of the present disclosure are not so limited. Rather, the specially or uniquely purposed RFID tags disclosed herein may be configured to transmit a positive or "TRUE" signal, such that the receipt of the positive or "TRUE" signal indicates that an attribute or element of a condition is present, and the absence of the positive or "TRUE" signal implies that the attribute or element is not present.

Additionally, although some of the embodiments of the present disclosure are directed to tracking locations of tools such as staplers, tape dispensers or telephones, those of ordinary skill in the pertinent arts will recognize that the present disclosure is not limited to any type or form of object or apparatus, and that locations of any type or form of object or apparatus to which an RFID tag may be applied or with which an RFID tag may be associated may be tracked. Such objects may include but are not limited to computing devices such as laptop computers, tablet computers, smartphones or the like, as well as any type or form of writing implement, office supplies, workshop tools, or electrical component.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 7, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale. For example, referring again to FIG. 4, the RFID antennas 442-1 through 442-9 may be sized to fill an entire sector of the working surface 452, or a small portion thereof, in accordance with the present disclosure.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A tracking system comprising:
    an RFID reader having at least one RFID antenna configured to provide an electromagnetic field;
    an object having at least a first RFID tag and a second RFID tag provided on at least one surface of the object, wherein the first RFID tag is configured to transmit a first RFID signal comprising first data regarding a first attribute of a condition of the object in the presence of the electromagnetic field, and wherein the second RFID tag is configured to transmit a second RFID signal comprising second data regarding a second attribute of the condition of the object in the presence of the electromagnetic field;
    a first non-conductive shielding label releasably applied over the first RFID tag on the at least one surface of the object, wherein the first non-conductive shielding label is configured to inhibit passage of the electromagnetic field therethrough, and wherein a first indicator of the first attribute of the condition of the object is printed on an external face of the first non-conductive shielding label; and a computing device in communication with at least the RFID reader, wherein the computing device is configured to at least:
identify the object;
determine whether at least one of the first RFID signal or the second RFID signal is received by the at least one RFID antenna;
in response to determining that the second RFID signal is received by the at least one RFID antenna,
interpret the second data received in the second RFID signal;
determine that the condition of the object is subject to the second attribute based at least in part on the second data; and
store an indication that the condition of the object is subject to the second attribute in at least one data store.

2. The tracking system of claim 1, further comprising a second non-conductive shielding label releasably applied over the second RFID tag on the at least one surface of the object, wherein the second non-conductive shielding label is configured to inhibit passage of the electromagnetic field therethrough, and wherein a second indicator of the second attribute of the condition of the object is printed on an external face of the second non-conductive shielding label, and wherein the computing device is further configured to at least:
in response to determining that neither the first RFID signal nor the second RFID signal is received by the at least one RFID antenna from the first RFID tag or the second RFID tag,
store an indication that the condition of the object is satisfactory in at least one data store.

3. The tracking system of claim 1, wherein at least one of the first RFID signal or the second RFID signal is a positive signal relating to one of the first attribute or the second attribute of the condition of the object.

4. The tracking system of claim 1, wherein the first non-conductive shielding label comprises at least one layer of polyethylene terephthalate film.

5. The tracking system of claim 1, wherein a second non-conductive shielding label is not releasably provided over the second RFID tag.

6. The tracking system of claim 1, wherein the object further includes at least one bar code on the at least one surface of the object, and wherein the computing device is further configured to at least:
identify the object based at least in part on the at least one bar code.

7. The tracking system of claim 1, wherein the object is a container having at least one item therein, and wherein the second data identifies a status of an integrity of the container.

8. A computer-implemented method comprising:
providing an object having a plurality of RFID tags on at least one surface, wherein each of the plurality of RFID tags is configured to transmit a unique RFID signal, wherein each of the unique RFID signals comprises data associated with one of a plurality of attributes of a condition of the object;
identifying the object;
determining whether each of the unique RFID signals is received by at least one RFID antenna associated with at least one RFID reader; and
in response to determining that at least one of the unique RFID signals is not received by the at least one RFID antenna, associated with the at least one RFID reader;
identifying the at least one of the unique RFID signals that was not received;
determining at least one attribute of the condition of the object associated with the at least one RFID signal that was not received; and
storing an indication of the condition of the object in at least one data store, wherein the indication is based at least in part on the at least one attribute of the condition of the object associated with the at least one RFID signal that was not received;
wherein the object further comprises a non-conductive shielding label releasably provided over at least a portion of at least one of the plurality of RFID tags from which the at least one of the unique RFID signals is not received, the non-conductive shielding label comprising at least one layer of polyethylene terephthalate film adhered over the at least one of the plurality of RFID tags from which the at least one of the unique RFID signals is not received by a non-conductive adhesive.

9. The computer-implemented method of claim 8, further comprising:
in response to determining that each of the RFID signals is received from each of the plurality of RFID tags by the at least one RFID antenna associated with the at least one RFID reader,
store an indication of the condition of the object in the at least one data store, wherein the indication is that the condition of the object is satisfactory.

10. The computer-implemented method of claim 8, wherein the plurality of RFID tags are provided in a matrix on the at least one surface.

11. The computer-implemented method of claim 8, wherein at least one of the unique RFID signals is a negative signal relating to the one of the plurality of the attributes of the condition of the object.

12. The computer-implemented method of claim 8, wherein the object is a container, and wherein each of the plurality of the attributes is a unique aspect of a status of an integrity of the container.

13. The computer-implemented method of claim 8, wherein the object further comprises at least one of a bar code or an identifying RFID tag provided on the at least one surface, and wherein identifying the object further comprises:
reading the bar code using at least one imaging device; or
receiving at least one RFID signal from the identifying RFID tag by the at least one RFID antenna associated with the at least one RFID reader.

14. The computer-implemented method of claim 8, wherein identifying the at least one of the unique RFID signals that was not received comprises:
identifying each of the plurality of RFID tags from which the unique RFID signal was not received;
identifying attributes of the condition of the object associated with each of the unique RFID signals not received;
determining information regarding the condition of the object based at least in part on the attributes associated with each of the unique RFID signals not received; and causing a display of at least some of the information regarding the condition of the object on at least one computer display.

15. An RFID transmitting device comprising:
   an RFID tag provided on a non-conductive adhesive substrate, wherein the RFID tag is configured to transmit a unique RFID signal associated with an attribute of a condition of an object when the RFID tag is coupled with an RFID reader; and
   at least one layer formed of a non-conductive electromagnetic energy shielding material, wherein the at least one layer releasably covers at least a portion of the RFID tag, the at least one layer comprising a flexible polyethylene terephthalate film releasably covering at least the portion of the RFID tag by a non-conductive adhesive, and
   wherein information regarding the attribute is printed on an external face of the at least one layer.

16. The RFID transmitting device of claim 15, wherein the RFID tag is provided in a matrix including a plurality of other RFID tags on at least one surface of the object, and
   wherein each of the plurality of other RFID tags is configured to transmit a unique RFID signal associated with another attribute of the condition of the object when each of the plurality of other RFID tags is coupled with the RFID reader.

17. The tracking system of claim 1, wherein the computing device is further configured to at least:
   determine that the first RFID signal is not received by the at least one RFID antenna; and
   in response to determining that the first RFID signal is not received by the at least one RFID antenna,
      store an indication that the condition of the object is not subject to the first attribute in the at least one data store.

* * * * *